(12) United States Patent
Kowalczyk et al.

(10) Patent No.: US 8,422,847 B2
(45) Date of Patent: Apr. 16, 2013

(54) RAPID UNIVERSAL RACK MOUNT ENCLOSURE

(75) Inventors: Scott C. Kowalczyk, Savage, MN (US); Jonathan Walter Coan, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 336 days.

(21) Appl. No.: 12/840,834

(22) Filed: Jul. 21, 2010

(65) Prior Publication Data

US 2011/0044599 A1  Feb. 24, 2011

Related U.S. Application Data

(60) Provisional application No. 61/227,247, filed on Jul. 21, 2009, provisional application No. 61/261,657, filed on Nov. 16, 2009.

(51) Int. Cl.
G02B 6/00 (2006.01)

(52) U.S. Cl.
USPC .......................................... 385/135; 385/134

(58) Field of Classification Search .................. 385/135
See application file for complete search history.

(56) References Cited

U.S. PATENT DOCUMENTS

| | | | |
|---|---|---|---|
| 1,276,825 A | 8/1918 | Swope | |
| 1,442,999 A | 1/1923 | Boardman et al. | |
| 1,446,410 A | 2/1923 | McCormick et al. | |
| 1,474,580 A | 11/1923 | Clark et al. | |
| RE20,995 E | 2/1939 | Beasley | |
| 2,502,496 A | 4/1950 | Wickman | |
| 2,521,226 A | 9/1950 | Keller | |
| 2,727,703 A | 12/1955 | Bonnett | |
| 3,131,729 A | 5/1964 | Rudolf | |
| 3,657,491 A | 4/1972 | Ryder et al. | |
| 3,667,417 A | 6/1972 | Clinkenbeard | |
| 3,920,308 A | 11/1975 | Murray | |

(Continued)

FOREIGN PATENT DOCUMENTS

DE  42 26 368 A1  2/1994
EP  1 107 031 A1  6/2001

(Continued)

OTHER PUBLICATIONS

International Search Report and Written Opinion mailed Feb. 1, 2011.

(Continued)

*Primary Examiner* — Sung Pak
(74) *Attorney, Agent, or Firm* — Merchant & Gould P.C.

(57) ABSTRACT

A cable enclosure assembly includes an enclosure, a cable spool and a length of fiber optic cable. The enclosure defines an interior region, a first opening and a second opening aligned with the first opening. The first and second openings provide access to the interior region. The cable spool is disposed in the interior region of the enclosure and is rotatably engaged with the enclosure. The cable spool includes a drum and a flange engaged to the drum. The flange has an outer peripheral side, a cable management portion and an adapter bulkhead portion. The adapter bulkhead portion extends outwardly from the cable management portion and forms a portion of the outer peripheral side. The length of the fiber optic cable is dispose about the drum of the cable spool.

24 Claims, 16 Drawing Sheets

U.S. PATENT DOCUMENTS

| | | | |
|---|---|---|---|
| 3,940,086 A | 2/1976 | Stoqulet |
| 4,053,118 A | 10/1977 | Aikins |
| 4,081,258 A | 3/1978 | Goell et al. |
| 4,384,688 A | 5/1983 | Smith |
| 4,587,801 A | 5/1986 | Missout et al. |
| 4,635,875 A | 1/1987 | Apple |
| 4,666,237 A | 5/1987 | Mallinson |
| 4,767,073 A | 8/1988 | Malzacher |
| 4,869,437 A | 9/1989 | Berz et al. |
| 4,883,337 A | 11/1989 | Dahlgren |
| 4,913,369 A | 4/1990 | Lia et al. |
| 4,939,798 A | 7/1990 | Last |
| 4,940,859 A | 7/1990 | Peterson |
| 5,016,554 A | 5/1991 | Harris et al. |
| 5,066,256 A | 11/1991 | Ward |
| 5,074,863 A | 12/1991 | Dines |
| 5,185,843 A | 2/1993 | Aberson et al. |
| 5,214,730 A | 5/1993 | Nagasawa et al. |
| 5,265,815 A | 11/1993 | Soyka et al. |
| 5,280,861 A | 1/1994 | Corriveau |
| 5,317,663 A | 5/1994 | Beard et al. |
| 5,335,874 A | 8/1994 | Shrum et al. |
| 5,494,446 A | 2/1996 | DeLucia et al. |
| 5,497,444 A | 3/1996 | Wheeler |
| 5,519,275 A | 5/1996 | Scott et al. |
| 5,522,561 A | 6/1996 | Koyamatsu et al. |
| 5,544,836 A | 8/1996 | Pera |
| 5,551,545 A | 9/1996 | Gelfman |
| 5,638,481 A | 6/1997 | Arnett |
| 5,703,990 A | 12/1997 | Robertson et al. |
| 5,709,347 A | 1/1998 | Hoffmann et al. |
| 5,717,810 A | 2/1998 | Wheeler |
| 5,718,397 A | 2/1998 | Stevens |
| 5,749,148 A | 5/1998 | White et al. |
| 5,787,219 A | 7/1998 | Muellet et al. |
| 5,915,640 A | 6/1999 | Wagter et al. |
| 5,987,203 A | 11/1999 | Abel et al. |
| 5,992,787 A | 11/1999 | Burke |
| 6,220,413 B1 | 4/2001 | Walters et al. |
| 6,315,598 B1 | 11/2001 | Elliot et al. |
| 6,494,396 B2 | 12/2002 | Sugata |
| 6,522,826 B2 | 2/2003 | Gregory |
| 6,554,221 B2 | 4/2003 | Hinds |
| 6,591,051 B2 | 7/2003 | Solheid et al. |
| 6,616,080 B1 | 9/2003 | Edwards et al. |
| 6,669,129 B1 | 12/2003 | Shah |
| 6,711,339 B2 | 3/2004 | Puetz et al. |
| 6,834,517 B1 | 12/2004 | Sheehy, Jr. |
| 6,856,748 B1 | 2/2005 | Elkins, II et al. |
| 6,915,058 B2 | 7/2005 | Pons |
| 6,937,725 B2 | 8/2005 | Liao |
| 6,997,410 B1 | 2/2006 | Huang |
| 7,000,863 B2 | 2/2006 | Bethea et al. |
| 7,011,538 B2 | 3/2006 | Chang |
| 7,016,590 B2 | 3/2006 | Tanaka et al. |
| 7,017,721 B1 | 3/2006 | Bradford et al. |
| 7,220,144 B1 | 5/2007 | Elliot et al. |
| 7,315,681 B2 * | 1/2008 | Kewitsch ............... 385/135 |
| 7,346,253 B2 | 3/2008 | Bloodworth et al. |
| 7,364,108 B2 | 4/2008 | Kim et al. |
| 7,369,739 B2 | 5/2008 | Kline et al. |
| 7,400,814 B1 | 7/2008 | Hendrickson et al. |
| 7,522,806 B2 | 4/2009 | Hendrickson et al. |
| 7,546,018 B2 | 6/2009 | Hendrickson et al. |
| 7,587,111 B2 | 9/2009 | de Montmorillon et al. |
| 7,623,747 B2 | 11/2009 | de Montmorillon et al. |
| 7,756,379 B2 * | 7/2010 | Kowalczyk et al. ....... 385/135 |
| 8,189,984 B2 * | 5/2012 | Kowalczyk et al. ....... 385/135 |
| 8,229,267 B2 * | 7/2012 | Kowalczyk et al. ....... 385/135 |
| 2001/0048044 A1 | 12/2001 | Sugata |
| 2002/0023814 A1 | 2/2002 | Poutiatine |
| 2002/0164121 A1 | 11/2002 | Brennan et al. |
| 2002/0171002 A1 | 11/2002 | Kretsch et al. |
| 2003/0037480 A1 | 2/2003 | Davis |
| 2004/0170369 A1 | 9/2004 | Pons |
| 2004/0244430 A1 | 12/2004 | Sheehy et al. |
| 2005/0213920 A1 | 9/2005 | Tanaka et al. |
| 2005/0247136 A1 | 11/2005 | Cross et al. |
| 2005/0258411 A1 | 11/2005 | Zeitler |
| 2006/0163403 A1 | 7/2006 | Dickson |
| 2006/0183362 A1 | 8/2006 | Mullaney et al. |
| 2006/0210230 A1 | 9/2006 | Kline et al. |
| 2007/0025675 A1 | 2/2007 | Kramer |
| 2007/0036506 A1 * | 2/2007 | Kewitsch ............... 385/135 |
| 2007/0165995 A1 | 7/2007 | Reagan et al. |
| 2008/0035778 A1 | 2/2008 | Belden et al. |
| 2008/0037945 A1 | 2/2008 | Gniadek et al. |
| 2008/0292261 A1 * | 11/2008 | Kowalczyk et al. ....... 385/135 |
| 2008/0315030 A1 | 12/2008 | Hendrickson et al. |
| 2009/0060441 A1 | 3/2009 | Kowalczyk et al. |
| 2009/0324181 A1 | 12/2009 | Kachmar et al. |
| 2011/0317974 A1 * | 12/2011 | Krampotich et al. ....... 385/135 |

FOREIGN PATENT DOCUMENTS

| | | |
|---|---|---|
| EP | 1 978 390 A2 | 10/2008 |
| FR | 2566997 | 1/1986 |
| JP | 9-236709 | 9/1997 |
| JP | 11-349230 | 12/1999 |
| JP | 2003114339 | 4/2003 |
| JP | 2005-73365 | 3/2005 |
| JP | 2005-249858 | 9/2005 |
| WO | WO 2009/048680 A1 | 4/2009 |

OTHER PUBLICATIONS

7 Inch Modules, ADC Telecommunications, Inc, © 1998, "7 Inch Connector Module with IFC", pp. 127.

U.S. Appl. No. 12/775,011.

U.S. Appl. No. 12/779,198.

Description of Admitted Prior Art, 30 pages.

F3DF Modules, ADC Telecommunications, Inc. © 1995, "Individual 12-Pack Assemblies", pp. 90.

Fiber Cable Management Products, Third Edition, ADC Telecommunications, Inc., © 1995, 1998.

Fiber Distribution Frame, Pre-Terminated Rear Load Connector Module, Installation Instructions, ADC Telecommunications, Inc., © 2000.

Fiber Main Distribution Frame (FMDF), Fiber Terminal Block, Installation Instructions, ADC Telecommunications, Inc., © 2001.

Fiber Panel Products—Cable Management Tray Panels, ADC Telecommunications, Inc., © 1994, 1996 "72 Fiber Distribution Module (FDM) with Intrafacility Fiber Cable", pp. 56.

Fiber Panel Products, Second Edition, ADC Telecommunications, Inc., © 1994, 1996.

FL2000 Products—Preconfigured Panels, ADC Telecommunications, Inc., © 2000 "Rack or Cabinet Mount Termination Panel with Multifiber Cable", pp. 13.

FL2000 Products, ADC Telecommunications, Inc., © 1994, 1996.

FL2000 Products, ADC Telecommunications, Inc., © 1994, 1996, "Rack Mount Panel with Intrafacility Fiber Cable", pp. 16.

IFC Style Frame Modules, ADC Telecommunications, Inc., © 1995, "Connector Module Equipped with IFC", pp. 27.

Next Generation Frame (NGF), Product Family Ordering Guide, ADC Telecommunications, Inc., © 1996, 1999, 2000, "Fiber Termination Blocks (FTB) Preterminated", pp. 8.

Next Generation Frame (NGF), Product Family Ordering Guide, ADC Telecommunications, Inc., © 1996, 1999, 2000.

Next Generation Frames—Fiber Termination Blocks, ADC Telecommunication, Inc., © 1998, "Fiber Termination Blocks (FTB) Preterminated" pp. 6.

Value-Added Module System, ADC Telecommunications, Inc., © 1993, 1194, 1998, "12-Pack Module Assemblies", pp. 30-31.

* cited by examiner

RAPID UNIVERSAL RACK MOUNT ENCLOSURE

CROSS-REFERENCE TO RELATED APPLICATIONS

The present application claims priority to U.S. Provisional Patent Application Ser. No. 61/227,247 entitled "Rapid Universal Rack Mount Drawer" and filed on Jul. 21, 2009 and U.S. Provisional Patent Application Ser. No. 61/261,657 entitled "Rapid Universal Rack Mount Drawer" and filed on Nov. 16, 2009, the disclosures of which are hereby incorporated by reference in their entirety.

BACKGROUND

In the telecommunications industry, use of fiber optic cables for carrying transmission signals is rapidly growing. Fiber distribution frames are adapted to aid in the connection of fiber optic equipment. To connect fiber optic equipment in the fiber distribution frame or to connect fiber optic equipment between fiber distribution frames, fiber optic cable is routed between the fiber optic equipment and/or the fiber distribution frames. However, the length of fiber optic cable needed between the fiber optic equipment and/or the fiber distribution frames varies depending on the location of the equipment in the fiber distribution frame or the location of the fiber distribution frames. As a result, there is a need for a system to effectively manage varying lengths of fiber optic cable.

SUMMARY

An aspect of the present disclosure relates to a cable enclosure assembly. The cable enclosure assembly includes an enclosure, a cable spool and a length of fiber optic cable. The enclosure defines an interior region, a first opening and a second opening aligned with the first opening. The first and second openings provide access to the interior region. The cable spool is disposed in the interior region of the enclosure and is rotatably engaged with the enclosure. The cable spool includes a drum and a flange engaged to the drum. The flange has an outer peripheral side, a cable management portion and an adapter bulkhead portion. The adapter bulkhead portion extends outwardly from the cable management portion and forms a portion of the outer peripheral side. The length of the fiber optic cable is dispose about the drum of the cable spool.

Another aspect of the present disclosure relates to a cable enclosure assembly. The cable enclosure assembly includes an enclosure, a cable spool, a plurality of adapters and a length of fiber optic cable. The enclosure defines an interior region and a first opening. The first opening provides access to the interior region. The cable spool is disposed in the interior region of the enclosure and rotatably engaged with the enclosure. The cable spool includes a drum and a flange engaged to the drum. The flange includes an adapter bulkhead portion. The plurality of adapters is disposed on the adapter bulkhead portion. Each of the adapters including a first side and a second side. The length of fiber optic cable is disposed about the drum of the cable spool. The fiber optic cable includes a first end and an oppositely disposed second end. The first end has connectors engaged to the second sides of the adapters. The cable spool is rotatable in the enclosure to a first stored position in which the first sides of the adapters are aligned with the first opening and accessible through the first opening.

Another aspect of the present disclosure relates to a cable enclosure assembly. The cable enclosure assembly includes an enclosure, a cable spool, a plurality of adapters, a length of fiber optic cable, a first plurality of bend radius protectors and a spool lock. The enclosure defines an interior region and a first opening that provides access to the interior region. The cable spool is disposed in the interior region of the enclosure and rotatably engaged with the enclosure. The cable spool includes a drum and a flange engaged to the drum. The flange includes an adapter bulkhead portion. The plurality of adapters is disposed on the adapter bulkhead portion. Each of the adapters including a first side and a second side. The length of fiber optic cable is disposed about the drum of the cable spool. The fiber optic cable includes a first end and an oppositely disposed second end. The first end has connectors engaged to the second sides of the adapters. The first plurality of bend radius protectors is disposed adjacent to the first opening. The spool lock is adapted for engagement with the cable spool to prevent rotation of the cable spool relative to the enclosure. The spool lock is adapted to engage the cable spool when the cable spool is in a first stored position in which the first sides of the adapters are aligned with the first opening and accessible through the first opening.

Another aspect of the present disclosure relates to cable routing configurations that incorporate rotating spool technology.

Another aspect of the present disclosure relates to a fiber optic network assembly. The fiber optic network assembly includes a first optical distribution frame having a cable enclosure assembly. The cable enclosure assembly includes an enclosure mounted to the first optical distribution frame. A cable spool is rotatably disposed in the enclosure. A length of fiber optic cable is wrapped around the cable spool. The fiber optic cable has a first end and an oppositely disposed second end. The second end includes a multi-fiber connector. A second optical distribution frame includes an adapted that is remotely disposed from the first optical distribution frame. The second end of the fiber optic cable of the cable enclosure assembly of the first optical distribution frame is engaged to the adapter of the second optical distribution frame.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
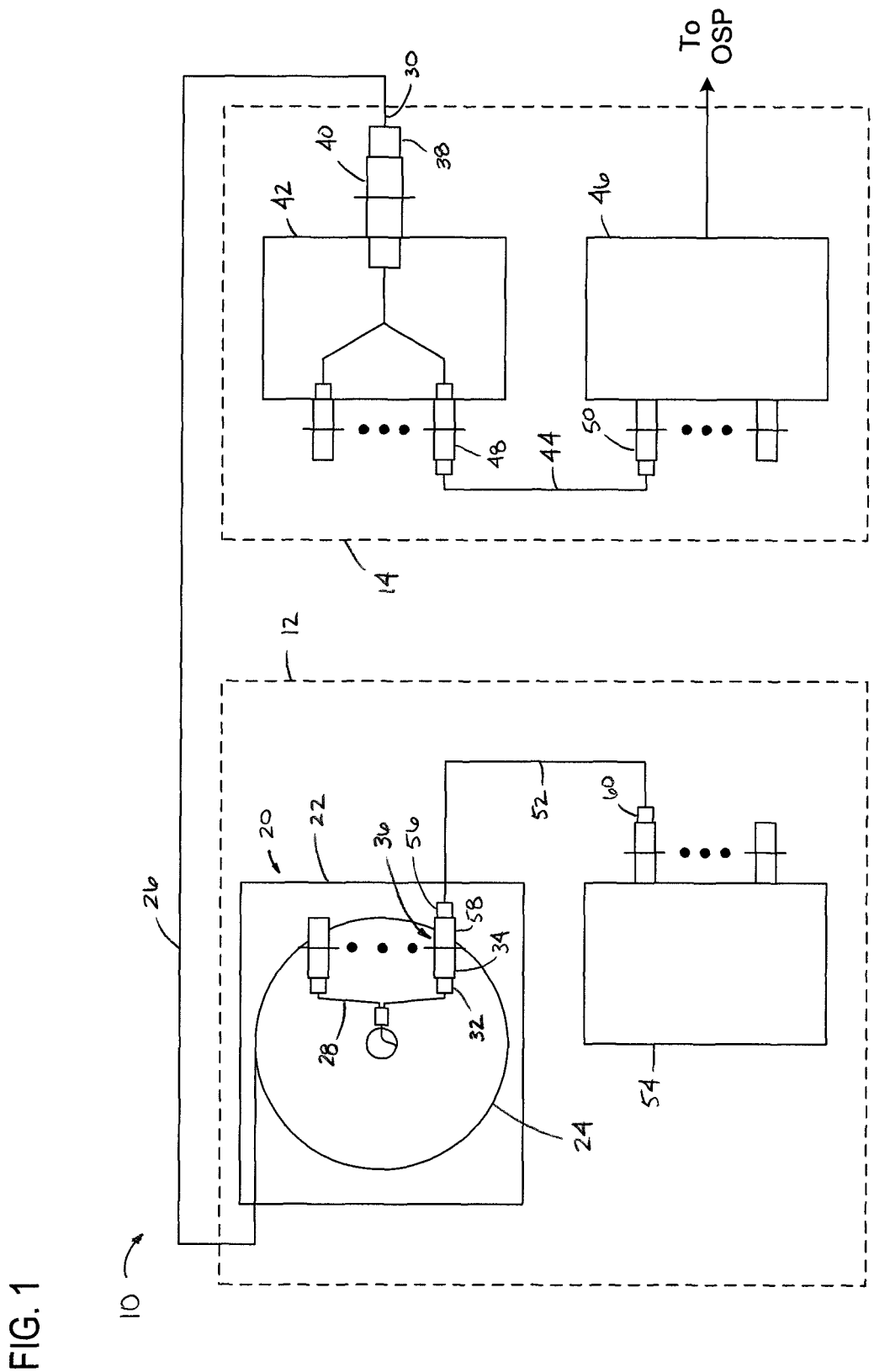
FIG. 1 is a schematic representation of a fiber optic network assembly having exemplary features of aspects in accordance with the principles of the present disclosure.

Referring now to FIG. 1, a fiber optic network assembly, generally designated 10, is shown. In one aspect of the present disclosure, the fiber optic network assembly 10 includes a first optical distribution frame 12 and a second optical distribution frame 14.

The first optical distribution frame 12 includes a cable enclosure assembly, generally designated 20. The cable enclosure assembly 20 includes an enclosure 22 and a cable spool 24 rotatably disposed in the enclosure 22.

A length of fiber optic cable 26 is wrapped around the cable spool 24. In one aspect of the present disclosure, the length of fiber optic cable 26 wrapped around the cable spool 24 is greater than or equal to about 80 feet. In another aspect of the present disclosure, the length of fiber optic cable 26 wrapped around the cable spool 24 is greater than or equal to about 100 feet. In one aspect of the present disclosure, the fiber optic cable 26 has an outer diameter that is 3 millimeter.

In the depicted embodiment of FIG. 1, the fiber optic cable 26 is a multi-fiber cable. In one aspect of the present disclosure, the fiber optic cable 26 includes at least 6 fibers. In another aspect of the present disclosure, the fiber optic cable 26 includes at least 12 fibers.

The fiber optic cable 26 includes a first end 28 and an oppositely disposed second end 30. In one aspect of the present disclosure, the first end 28 and second ends 30 are connectorized.

In the depicted embodiment of FIG. 1, the first end 28 includes a plurality of single fiber connectors 32 (e.g., SC connectors, LC connectors, LX.5 connectors, ST connectors, FC connectors, MU connectors, etc.). The plurality of single fiber connectors 32 is adapted for engagement with a first side 34 of a plurality of fiber optic adapters 36. In the depicted embodiment of FIG. 1, the plurality of adapters 36 is disposed on the cable spool 24 so that the plurality of adapters 36 rotates in unison with the cable spool 24 when the fiber optic cable 26 is dispensed from the cable spool 24.

Figure 2:
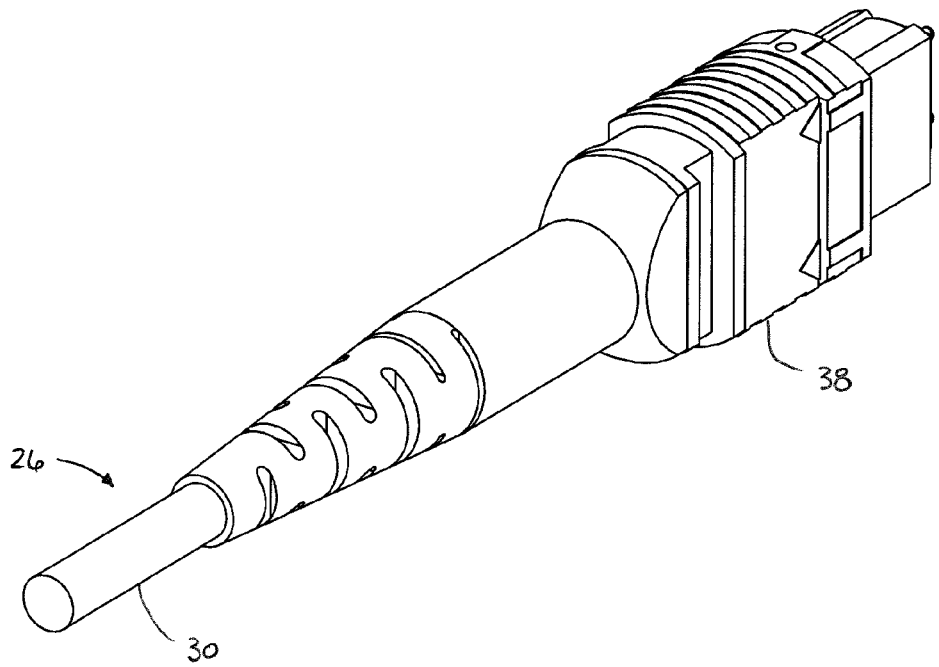
FIG. 2 is a rear perspective view of a multi-fiber connector suitable for use in the fiber optic network assembly of FIG. 1.
Figure 3:
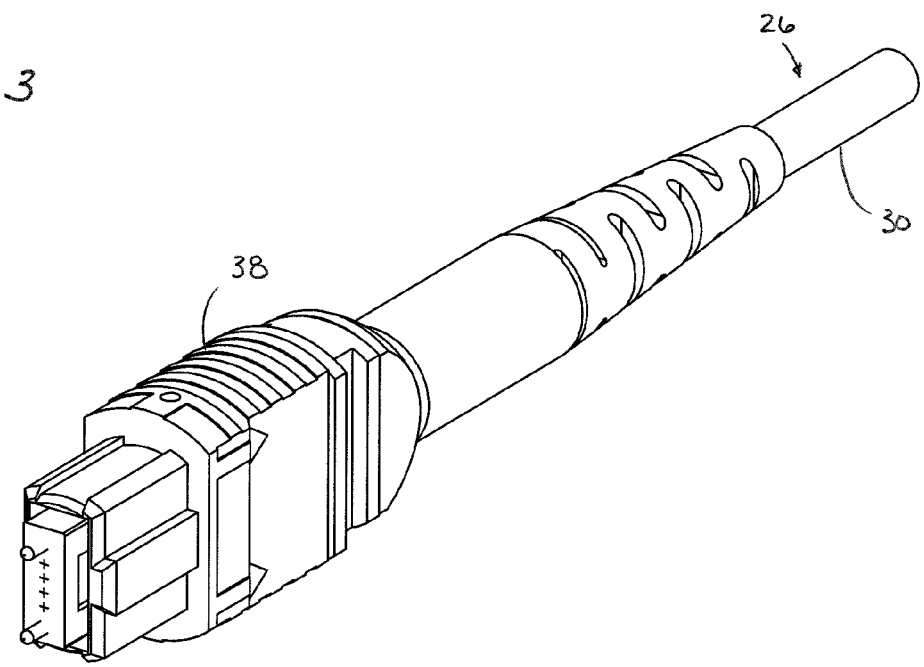
FIG. 3 is a front perspective view of the multi-fiber connector of FIG. 2.

Referring now to FIGS. 1-3, the second end 30 of the fiber optic cable 26 includes a multi-fiber connector 38 (e.g., MT connector, Multi-fiber Push-On (MPO) connector, etc.). An exemplary multi-fiber connector suitable for use with the fiber optic cable 26 is disclosed in U.S. Pat. No. 5,214,730, the disclosure of which is hereby incorporated by reference in its entirety. Exemplary multi-fiber connectors suitable for use with the fiber optic cable 26 are available from US Conec Ltd. of Hickory, N.C., USA as part numbers C10821, C10822, C8190, and C10823. Fiber optic connectors related to part numbers C10821, C10822, C8190, and C10823 are known as MTP® connectors. A suitable multi-fiber connector has been described in U.S. Patent Application Publication No. 2009/0324181, the disclosure of which is hereby incorporated by reference in its entirety.

The multi-fiber connector 38 is adapted for engagement with an adapter 40. The adapter 40 is adapted to mechanical couple the multi-fiber connector 38 to a second multi-fiber connector. The adapter 40 is remotely disposed from the fiber optic cable enclosure assembly 20. In the depicted embodiment of FIG. 1, the adapter 40 is disposed on a first panel assembly 42 of the second optical distribution frame 14.

In one aspect of the present disclosure, the second end 30 of the fiber optic cable 26 is paid out from the cable spool 24 by pulling on the second end 30 of the fiber optic cable 26. As the fiber optic cable 26 is pulled, the cable spool 24 rotates relative to the enclosure 22. Since the plurality of adapters 36 is disposed on the cable spool 24, the first end 28 of the fiber optic cable 26 can remain connected to the plurality of adapters 36 without damaging the fiber optic cable 26.

Figure 4:
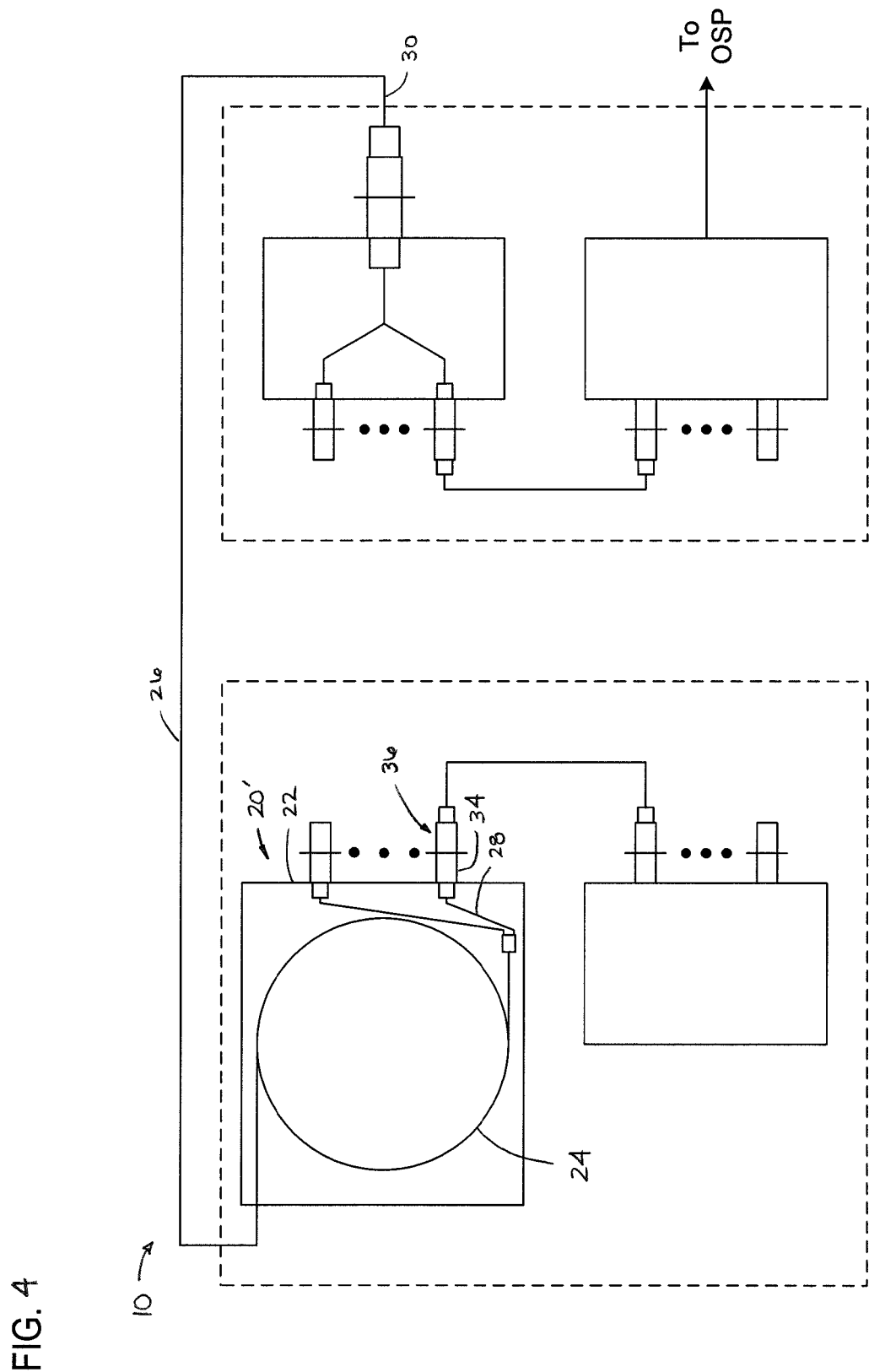
FIG. 4 is an alternate embodiment of the fiber optic network assembly of FIG. 1.

Referring now to FIG. 4, an alternate embodiment of a cable enclosure assembly 20' is shown in which the plurality of adapters 36 is disposed on the enclosure 22 so that the plurality of adapters 36 is remote from the cable spool 24. In this embodiment, the first end 28 of the fiber optic cable 26 is disconnected from the first side 34 of the adapters 36 so that the second end 30 of the fiber optic cable 26 can be paid out without damaging the fiber optic cable 26. In one aspect of the present disclosure, the first end 28 of the fiber optic cable 26 is stored on the cable spool 24 while the second end 30 of the fiber optic cable 26 is paid out. In another aspect of the present disclosure, the first end 28 of the fiber optic cable 26 is stored on a flange of the cable spool 24 while the second end 30 is paid out. The first end 28 of the fiber optic cable 26 is engaged to the plurality of adapters 36 after a desired length of the fiber optic cable 26 has been paid out from the cable spool 24.

Referring again to FIG. 1, a cross-connect cable 44 optically connects the first panel assembly 42 of the second optical distribution frame 14 to a second panel assembly 46 of the second optical distribution frame 14. In the depicted embodiment of FIG. 1, the cross-connect cable 44 is engaged to one of a first plurality of adapters 48 on the first panel assembly 42 and one of a second plurality of adapters 50 on the second panel assembly 46 of the second optical distribution frame 14.

A jumper cable 52 optically connects the fiber optic enclosure assembly 20 of the first optical distribution frame 12 to an active component 54 of the first optical distribution frame 12. In the depicted embodiment of FIG. 1, a first connectorized end 56 of a jumper cable 52 is engaged to a second side 58 of one of the plurality of adapters 36 of the fiber optic cable enclosure assembly 20 while a second connectorized end 60 of the jumper cable 52 is optically engaged to the active component 54. In one aspect of the present disclosure, the jumper cable 52 has a length that is greater than or equal to 2 feet. In another aspect of the present disclosure, the length of the jumper cable 52 is greater than or equal to 5 feet. In another aspect of the present disclosure, the length of the jumper cable 52 is greater than or equal to 10 feet.

Figure 5:
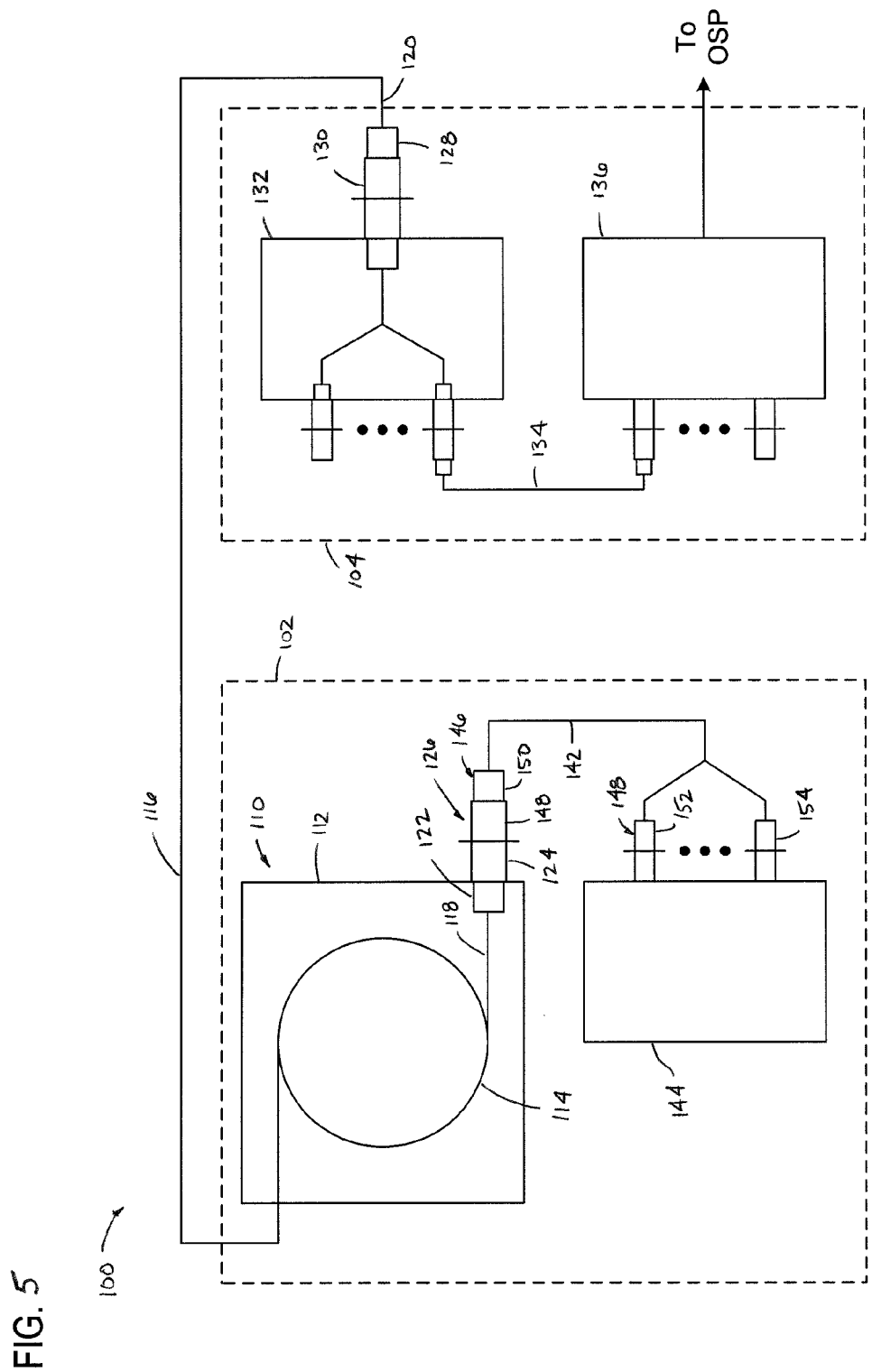
FIG. 5 is an alternate embodiment of the fiber optic network assembly of FIG. 1.

Referring now to FIG. 5, an alternate embodiment of a fiber optic network assembly 100 is shown. In this embodiment, the first optical fiber optic network assembly 100 includes a first optical distribution frame 102 and a second optical distribution frame 104.

The first optical distribution frame 102 includes a cable enclosure assembly, generally designated 110. The cable enclosure assembly 110 includes an enclosure 112 and a cable spool 114 rotatably disposed in the enclosure 112. A length of multi-fiber fiber optic cable 116 is wrapped around the cable spool 114.

The fiber optic cable 116 includes a first end 118 and an oppositely disposed second end 120. In one aspect of the present disclosure, the first end 118 and second ends 120 are connectorized.

In the depicted embodiment of FIG. 5, the first end 118 includes a first multi-fiber connector 122 (e.g., MT connector, Multi-fiber Push-On (MPO) connector, etc.). The first multi-fiber connector 122 is adapted for engagement with a first side 124 of a multi-fiber adapter 126 disposed on the enclosure 112 of the cable enclosure assembly 110 so that the multi-fiber adapter 126 is remote from the cable spool 114.

The second end 120 of the fiber optic cable 116 includes a second multi-fiber connector 128 (e.g., MT connector, Multi-fiber Push-On (MPO) connector, etc.). The second multi-fiber connector 128 is adapted for engagement with an adapter 130 that is remotely disposed from the cable enclosure assembly 110. In the depicted embodiment of FIG. 5, the adapter 130 is disposed on a first panel assembly 132 of the second optical distribution frame 104.

In one aspect of the present disclosure, the second end 120 of the fiber optic cable 116 is paid out from the cable spool 114 by pulling on the second end 120 of the fiber optic cable 116. As the fiber optic cable 116 is pulled, the cable spool 114 rotates relative to the enclosure 112. As the second end 120 of the fiber optic cable 116 is paid out, the first end 118 of the fiber optic cable 116 is stored on the cable spool 114. The first end 118 of the fiber optic cable 116 is engaged to the multi-fiber adapter 126 after a desired length of the fiber optic cable 116 has been paid out from the cable spool 114.

A cross-connect cable 134 optically connects the first panel assembly 132 of the second optical distribution frame 104 to a second panel assembly 136 of the second optical distribution frame 104.

A patch cable 142 optically connects the fiber optic enclosure assembly 110 of the first optical distribution frame 102 to one or more active components 144 of the first optical distribution frame 102. The patch cable 142 includes a first connectorized end 146 and a second connectorized end 148. The first connectorized end 146 includes a multi-fiber connector 150 while the second connectorized end 148 includes a plurality of single fiber connectors 152. In the depicted embodiment of FIG. 5, the first connectorized end 146 of the patch cable 142 is engaged to a second side 148 of the multi-fiber adapter 126 of the fiber optic cable enclosure assembly 20 while the second connectorized end 148 of the patch cable 142 is optically engaged to a plurality of single fiber adapters 154 of the active component 144. In one aspect of the present disclosure, the patch cable 142 has a length that is greater than or equal to about 2 feet. In another aspect of the present disclosure, the length of the patch cable 142 is greater than or equal to about 5 feet. In another aspect of the present disclosure, the length of the patch cable 142 is greater than or equal to about 10 feet.

Figure 6:
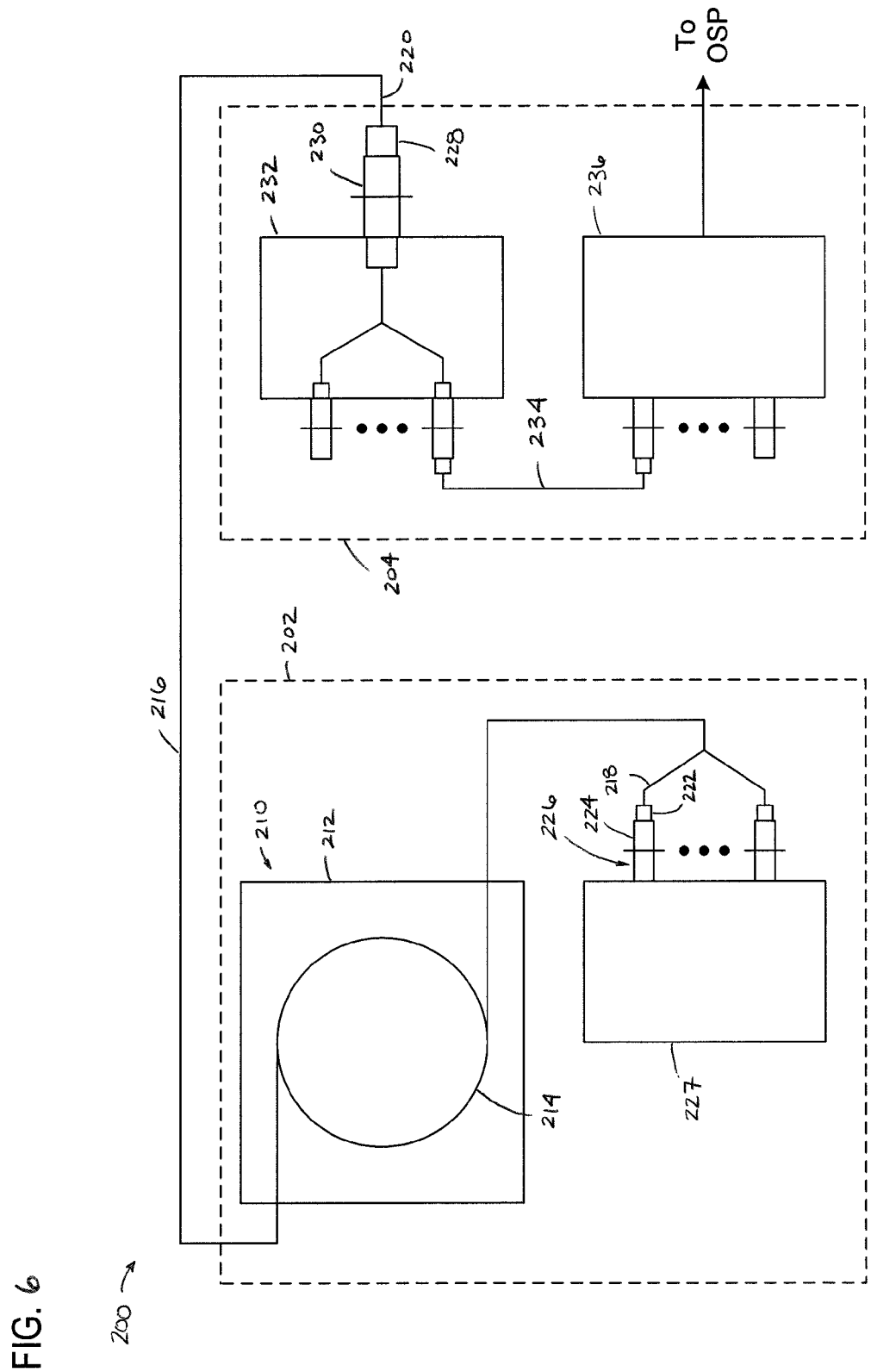
FIG. 6 is an alternate embodiment of the fiber optic network assembly of FIG. 1.

Referring now to FIG. 6, an alternate embodiment of a fiber optic network assembly 200 is shown. In this embodiment, the first optical fiber optic network assembly 200 includes a first optical distribution frame 202 and a second optical distribution frame 204.

The first optical distribution frame 202 includes a cable enclosure assembly, generally designated 210. The cable enclosure assembly 210 includes an enclosure 212 and a cable spool 214 rotatably disposed in the enclosure 212. A length of multi-fiber fiber optic cable 216 is wrapped around the cable spool 214.

The fiber optic cable 216 includes a first end 218 and an oppositely disposed second end 220. In one aspect of the present disclosure, the first end 218 and second ends 220 are connectorized.

In the depicted embodiment of FIG. 6, the first end 218 includes a plurality of single fiber connectors 222 (e.g., SC connectors, LC connectors, LX.5 connectors, ST connectors, FC connectors, MU connectors, etc.). The plurality of single fiber connectors 222 is adapted for engagement with a first side 224 of a plurality of adapters 226 disposed on an active component 227 of the first optical distribution frame 202.

The first end 218 optically connects the cable enclosure assembly 210 of the first optical distribution frame 202 to the active component 227 of the first optical distribution frame 202. The first end 218 extends outwardly from the cable enclosure assembly 210 by a length that is greater than or equal to about 2 feet. In another aspect of the present disclosure, the first end 218 extends outwardly from the cable enclosure assembly 210 by a length that is greater than or equal to about 5 feet. In another aspect of the present disclosure, the first end 218 extends outwardly from the cable enclosure assembly 210 by a length that is greater than or equal to about 10 feet.

The second end 220 of the fiber optic cable 116 includes a second multi-fiber connector 228 (e.g., MT connector, Multi-fiber Push-On (MPO) connector, etc.). The second multi-fiber connector 228 is adapted for engagement with an adapter 230 that is remotely disposed from the cable enclosure assembly 210. In the depicted embodiment of FIG. 6, the adapter 230 is disposed on a first panel assembly 232 of the second optical distribution frame 204.

In one aspect of the present disclosure, the second end 220 of the fiber optic cable 216 is paid out from the cable spool 214 by pulling on the second end 220 of the fiber optic cable 216. As the fiber optic cable 216 is pulled, the cable spool 214 rotates relative to the enclosure 212. As the second end 220 of the fiber optic cable 216 is paid out, the first end 218 of the fiber optic cable 216 is stored on the cable spool 214 and carried by the cable spool 214 as the cable spool 214 rotates. The first end 218 of the fiber optic cable 216 is engaged to the plurality of adapters 226 after a desired length of the fiber optic cable 216 has been paid out from the cable spool 214.

A cross-connect cable 234 optically connects the first panel assembly 232 of the second optical distribution frame 204 to a second panel assembly 236 of the second optical distribution frame 204.

Referring now to FIGS. 7-10, a cable enclosure assembly, generally designated 300, is shown. The cable enclosure assembly 300 includes an enclosure, generally designated 302, and a cable spool, generally designated 304, rotatably disposed in the enclosure 302.

The enclosure 302 includes a base 306, a first sidewall 307 and an oppositely disposed second sidewall 308. The first and second sidewalls 307, 308 extend outwardly from the base 306. In one aspect of the present disclosure, the first and second sidewalls 307, 308 extend outwardly in a direction that is generally perpendicular to the base 306. The first sidewall 307 includes a first end 309a and an oppositely disposed second end 309b while the second sidewall 308 includes a first end 310a and an oppositely disposed second end 310b.

The enclosure 302 has a height $H_D$ and a width $W_D$. The height $H_D$ of the enclosure 302 is generally equal to the distance the first and second sidewalls 307, 308 extend from the base 306. The width $W_D$ of the enclosure 302 is generally equal to the distance between the first and second sidewalls 307, 308.

Each of the first and second sidewalls 307, 308 includes a mounting bracket 312. In one aspect of the present disclosure, the mounting bracket 312 is generally L-shaped. The mounting bracket 312 includes a first end portion 313 that mounts to one of the first and second sidewalls 307, 308 and a second end portion 314 that is adapted for engagement with the first optical distribution frame 12 (shown in FIG. 1). In one aspect of the present disclosure, the first end portion 313 is engaged to one of the first and second sidewalls 307, 308 by a plurality of fasteners (e.g., screws, bolts, rivets, weld, adhesive, etc.).

The base 306 and the first and second sidewalls 307, 308 of the enclosure 302 cooperatively define an interior region 316 of the enclosure 302. The interior region 316 is adapted to receive the cable spool 304.

The enclosure 302 defines a first opening 318 disposed adjacent to the first ends 312a, 314a of the first and second sidewalls 308, 310 and an oppositely disposed second opening 320 disposed adjacent to the second ends 309b, 310b of the first and second sidewalls 307, 308. In one aspect of the present disclosure, the first ends 309a, 310a of the first and second sidewalls 307, 308 and the base 306 cooperatively define the first opening 318 while the second ends 309b, 310b of the first and second sidewalls 307, 308 and the base 306 cooperatively define the second opening 320. The first and second openings 318, 320 provide access to the interior region 316 of the enclosure 302.

The enclosure 302 includes a plurality bend radius protectors 322 disposed on the base 306 of the enclosure 302. Each of the bend radius protectors 322 includes a body 324 having a base end 326 and an oppositely disposed free end 328. The body 324 is arcuate in shape and includes a radius. The radius is sized to be greater than the minimum bend radius of a fiber optic cable. In one aspect of the present disclosure, the body 324 is shaped as a partial cylinder. A retention arm 330 extends outwardly from the body 324 in a generally radial direction at the free end 328. In one aspect of the present disclosure, the retention arm 330 is integral with the body 324.

In one aspect of the present disclosure, a first plurality of bend radius protectors 322a is disposed adjacent the first opening 318. In one aspect of the present disclosure, the first plurality of bend radius protectors 322a includes one bend radius protector 322 disposed adjacent to the first end 309a of the first sidewall 307 and another bend radius protector 322 disposed adjacent to the first end 310a of the second sidewall 308. A second plurality of bend radius protectors 322b is disposed adjacent the second opening 320. In one aspect of the present disclosure, the second plurality of bend radius protectors 322b includes one bend radius protector 322 disposed adjacent to the second end 309b of the first sidewall 307 and another bend radius protector 322 disposed adjacent the second end 310b of the second sidewall 308. In another aspect of the present disclosure, the second plurality of bend radius protectors 322b includes a first set of bend radius protectors 322 disposed adjacent to the second end 309b of the first sidewall 307 and a second set of bend radius protectors 322 disposed adjacent the second end 310b of the second sidewall 308. Each of the two sets of bend radius protectors 322 includes two bend radius protectors. The two bend radius protectors 322 are arranged so that the retention arms 330 of the bend radius protectors 322 are aligned and cooperatively define a channel 332 with the bodies 324 of the bend radius protectors 322.

The enclosure 302 further includes a plurality of cable clips 334 disposed adjacent to the first opening 318. In one aspect of the present disclosure, the cable clips 334 are disposed on opposite sides of the first opening 318.

The cable spool 304 is rotatably disposed in the interior region 316 of the enclosure 302. In one aspect of the present disclosure, the cable spool 304 includes a first flange 340, an oppositely disposed second flange 341 and a drum 342 disposed between the first and second flanges 340, 341. The drum 342 is adapted to receive a length of fiber optic cable 343. The length of fiber optic cable 343 is wrapped or coiled around the drum 342 and includes a first end 344 and an oppositely disposed second end 345. The outer diameter of the drum 342 is sized so that the outer diameter is greater than the minimum bend radius of the fiber optic cable 343.

In one embodiment, the fiber optic cable 343 includes optical fibers having reduced sensitivity to micro or macro-bending (hereinafter referred to as "bend insensitive"). Exemplary bend insensitive optical fibers have been described in U.S. Pat. Nos. 7,587,111 and 7,623,747, the disclosures of which are hereby incorporated by reference in their entirety. An exemplary bend insensitive optical fiber suitable for use in cable enclosure assembly 300 is commercially available from Draka Comteq under the name Bend-Bright XS.

The cable spool 304 includes a height $H_S$ and has an outer diameter $D_S$. The height $H_S$ of the cable spool 304 is measured along a rotational axis 346 of the cable spool 304 that extends through the center of the drum 342. In one aspect of the present disclosure, the height $H_S$ of the cable spool 304 is less than or equal to the height $H_D$ of the enclosure 302. In another aspect of the present disclosure, the height $H_S$ of the cable spool 304 is at least about 30% of the height $H_D$ of the enclosure 302. The outer diameter $D_S$ of the cable spool 304 is less than the width $W_D$ of the enclosure 302. In one aspect of the present disclosure, the outer diameter $D_S$ of the cable spool 304 is at least 75% of the width $W_D$ of the enclosure 302.

The first flange 340 includes a first surface 347, an oppositely disposed second surface 348, and an outer side 350 that extends around the perimeter of the first flange. The first surface 347 is disposed adjacent to the base 306. The second surface 348 is disposed adjacent to the drum 342. The outer side 350 of the first flange 340 is generally circular in shape. The outer side 350 includes a chordal side surface 354 that is generally planar in shape. The chordal side surface 354 is offset from the rotational axis 346.

The second flange 341 includes a first surface 355, an oppositely disposed second surface 356 that is disposed adjacent to the drum 342, and an outer peripheral side 358. The second flange 341 further includes a cable management portion 359 and an adapter bulkhead portion 360.

The cable management portion 359 of the second flange 341 is generally planar in shape and defines a cable pass-thru 362 that extends through the first and second surfaces 355, 356 of the second flange 341. The cable pass-thru 362 provides a passage through which a portion of the fiber optic cable 343 can pass from the drum 342 through the second flange 341 so that the portion of the fiber optic cable 343 that passes through the cable pass-thru 362 is disposed adjacent to the first surface 355 of the second flange 341.

The cable pass-thru 362 is located at a position that is offset from the rotational axis 346 of cable spool 304. In one aspect of the present disclosure, the cable pass-thru 362 is located at a radial distance from the rotational axis 346 that is greater than the radius of the drum 342.

The cable management portion 359 includes a plurality of bend radius protectors 366. In one aspect of the present disclosure, the bend radius protectors 366 are similar in structure to the bend radius protectors 322 previously described. The bend radius protectors 366 are configured to route the portion of the fiber optic cable 343 that passes through the cable pass-thru 362 from the cable pass-thru 362 to the adapter bulkhead portion 360. The cable management portion 359 further includes a cable spool 368. The cable spool 368 is adapted to receive an excess portion of the fiber optic cable 343 that passes through the cable pass-thru 362. The excess portion is wrapped around the cable spool 368. In one aspect of the present disclosure, the cable spool 368 is formed by at least two bend radius protectors 366. In another aspect of the present disclosure, the cable spool 368 is formed by at least three bend radius protectors 366.

The cable management portion 359 further includes a fan-out mounting area 370 that is adapted to receive a fan-out 372. The fan-out 372 serves as a transition location between ribbon-style cable and upjacketed fibers. In one aspect of the present disclosure, the upjacketed fibers have an outer diameter that is about 900 micrometers. In another aspect of the present disclosure, the upjacketed fibers have an outer diameter that is about 2 millimeters. In one aspect of the present disclosure, the fan-out mounting area 370 includes a clip that retains the fan-out 372 in the fan-out mounting area 370. In the depicted embodiment of FIGS. 7-10, the fan-out mounting area 370 is adapted to receive multiple fan-outs 372 in a stacked configuration.

The adapter bulkhead portion 360 extends outwardly from the cable management portion 359 of the second flange 341. In one aspect of the present disclosure, the adapter bulkhead portion 360 is about perpendicular to the cable management portion 359 so that the first surface 355 of the adapter bulkhead portion 360 faces the cable management portion 359 while the second surface 356 faces away from the cable management portion 359. In one aspect of the present disclosure, the adapter bulkhead portion 360 forms a portion of the outer peripheral side 358 of the second flange 341 so that the second surface 356 of the adapter bulkhead portion 360 is generally aligned with the chordal side surface 354 of the first flange 340 of the cable spool 304. In one aspect of the present disclosure, the second surface 356 of the adapter bulkhead portion 360 of the second flange 341 and the chordal side surface 354 of the first flange 340 are generally offset from the first opening 318 of the enclosure 302 when the cable spool 304 is in a stored position (best shown in FIGS. 7 and 9).

In one aspect of the present disclosure, the adapter bulkhead portion 360 and the cable management portion 359 are monolithic. The second flange 341 is originally formed as a planar sheet after which the adapter bulkhead portion 360 is bent to the position shown in FIGS. 7-10.

The adapter bulkhead portion 360 is adapted to receive a plurality of adapters 374. In one aspect of the present disclosure, the adapter bulkhead portion 360 is adapted to receive at least 12 adapters 374. In another aspect of the present disclosure, the adapter bulkhead portion 360 is adapted to receive at least 24 adapters 374. In one aspect of the present disclosure, the adapter bulkhead portion 362 defines an adapter opening 376 in which the plurality of adapters 374 is mounted. In another aspect of the present disclosure, the adapter bulkhead portion 362 defines a plurality of openings 376 in which the plurality of adapters 374 is mounted.

Figure 11:
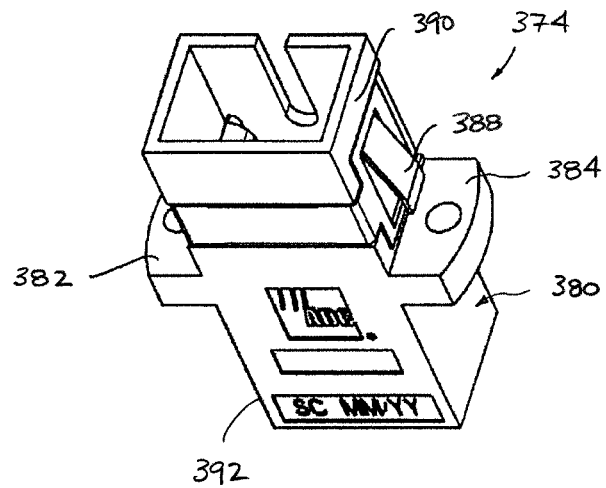
FIG. 11 is a perspective view of an adapter suitable for use with the cable enclosure assembly of FIG. 7.
Figure 12:
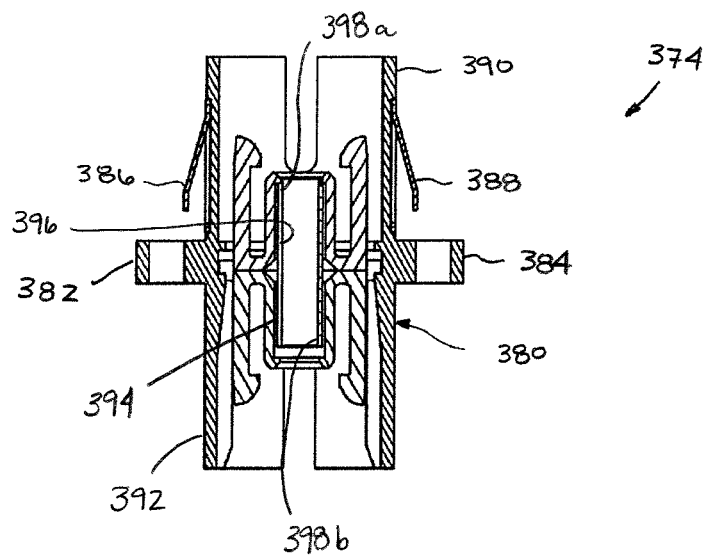
FIG. 12 is a cross-sectional view of the adapter of FIG. 11.

Referring now to FIGS. 11 and 12, one of the adapters 374 is shown. In the depicted embodiment of FIGS. 11 and 12, the adapter 374 is an SC-type adapter. As the SC-type adapter was described in U.S. Pat. No. 5,317,663, which is hereby incorporated by reference in its entirety, the SC-type adapter will only be briefly described herein. The SC-type adapter includes a main body 380 with a pair of tabs 382, 384 located on the exterior of the main body 380. The tabs 382, 384 serve to support the adapter 374 in the adapter bulkhead portion 360 of the second flange 341. The adapter 374 further includes a pair of retaining clips 386, 388, with one retaining clip 386, 388 associated with each tab 382, 384.

The adapter 374 includes a first side 390 and a second side 392. Each of the first and second sides 390, 392 is adapted to receive single fiber connectors. The first side 390 of the adapter 374 is inserted into the adapter bulkhead portion 360. As the adapter 374 is inserted through the adapter opening 376, the retaining clips 386, 388 compress against the main body 380. The adapter 374 is inserted into the adapter bulkhead portion 360 until the tabs 382, 384 abut the adapter bulkhead portion 360. With the tabs 382, 384 abutting the adapter bulkhead portion 360, the retaining clips 386, 388 decompress on the opposite side of the adapter bulkhead portion 360, thereby retaining the adapter bulkhead portion 360 between the retaining clips 386, 388 and the tabs 382, 384.

The adapter 374 further includes an alignment sleeve 394 disposed in the main body 380. The alignment sleeve 394 defines a central longitudinal bore 396 having a first opening 398a and an oppositely disposed second opening 398b. The first opening 398a is adapted to receive a first ferrule of a connectorized end of a fiber optic cable while the second opening 398b is adapted to receive a second ferrule of a connectorized end of another fiber optic cable. The alignment sleeve 394 is adapted to align the first and second ferrules for optical communication.

Referring now to FIGS. 7-10, the cable management portion 359 defines a first cable routing path 400 and a second cable routing path 402. The first cable routing path 400 routes a first group of fibers 343a of the fiber optic cable 343 to a first set 374a of the adapters 374 while the second cable routing path 402 routes a second group of fibers 343b the fiber optic cable 343 to a second set 374b of the adapters 374.

The first cable routing path 400 routes the first group of fibers 343a from the fan-out 372 in a first direction away from a second side 392 of the adapters 374. The first group of fibers 343a of the fiber optic cable 343 is then routed around a first plurality of bend radius protectors 366a. The first cable routing path 400 then routes the first group of fibers 343a in a second direction toward the second side 392 of the adapters 374 where the connectorized ends of the first group of fibers 343a are engaged with the second side 392 of the adapters 374.

The second cable routing path 402 routes the second group of fibers 343b from the fan-out 372 in the first direction away from the second side 392 of the adapters 374. The second group of fibers 343b of the fiber optic cable 343 is then routed around a second plurality of bend radius protectors 366b. The second plurality of bend radius protectors 366b is located on the second flange 341 in a mirror image arrangement with respect to a reference plane that is generally perpendicular to the adapter bulkhead portion 360 and extends through the rotational axis 346. The second group of fibers 343b of the fiber optic cable 343 is routed around the second plurality of bend radius protectors 366b in a direction that is opposite of the direction the first group of fiber 343a is routed around the first plurality of bend radius protectors 366a. The second cable routing path 402 then routes the second group of fiber 343b in the second direction toward the second side 392 of the adapters 374 where the connectorized ends of the second group of fibers 343a are engaged with the second side 392 of adapters 374.

Figure 10:
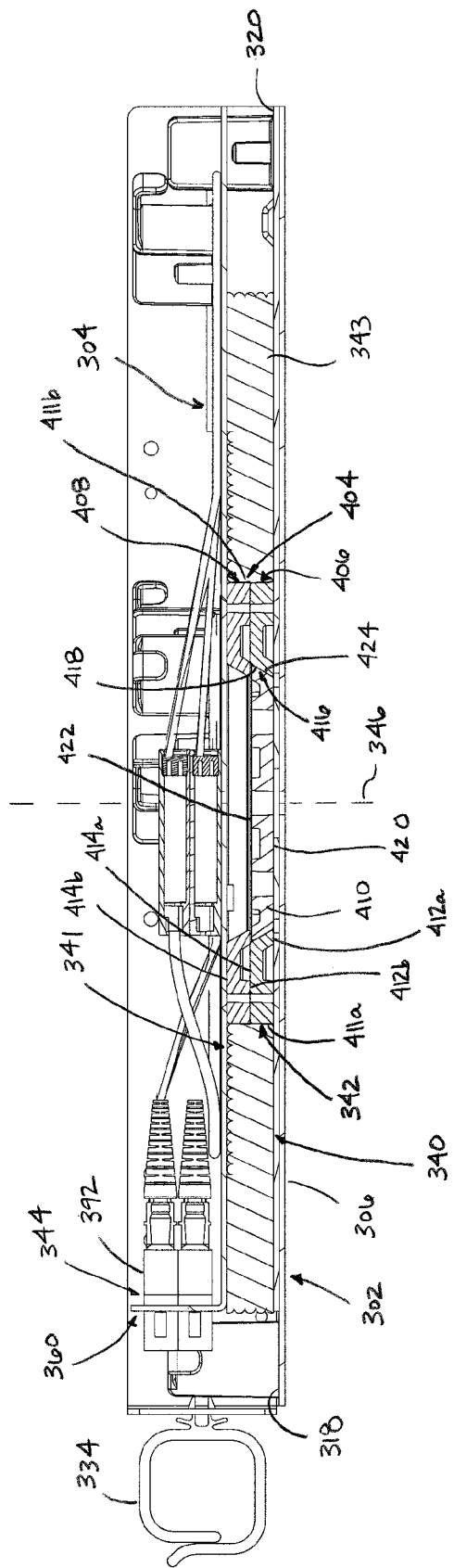
FIG. 10 is a cross-sectional view of the cable enclosure assembly of FIG. 7.

Referring now to FIG. 10, a bearing assembly 404 engages the cable spool 304 to the enclosure 302. In one aspect of the present disclosure, the bearing assembly 404 is a simple or plain bearing.

The bearing assembly 404 includes a first ring member 406, a second ring member 408 and a puck member 410. In one aspect of the present disclosure, the bearing assembly 404 is manufactured from a general purpose polycarbonate material. In another aspect of the present disclosure, the bearing assembly 404 is molded from a thermoplastic polyester resin, such as Valox resins.

In one aspect of the present disclosure, the first and second ring members 406, 408 are substantially similar. Each of the first and second ring members 406, 408 includes an outer circumferential surface 411a, 411b, respectively, a first surface 412a, 412b, respectively, and an oppositely disposed second surface 414a, 414b, respectively. The first and second surfaces 412, 414 are generally planar.

The first surface 412a of the first ring member 406 is adapted for engagement with the first flange 340 of the cable spool 304. The second surface 414a of the first ring member 406 is adapted for engagement with the first surface 412b of the second ring member 408. The second surface 414b of the second ring member 408 is adapted for engagement with the second flange 341.

The first ring member 406 defines an inner bore 416 having a bearing surface 418. The bearing surface 418 is disposed at an oblique angle relative to the rotational axis 346. In one aspect of the present disclosure, the oblique angle is less than about 90 degrees. In another aspect of the present disclosure, the oblique angle is in the range of about 30 degrees to about 75 degrees. In another aspect of the present disclosure, the oblique angle is in the range of about 45 degrees to about 60 degrees.

The puck member 410 is captured between the first and second ring members 406, 408 and is adapted for fixed engagement with the base 306 of the enclosure 302 and rotating engagement with the first ring member 406. The puck member 410 includes a first end surface 420, an oppositely disposed second end surface 422, and a mating bearing surface 424. In the subject embodiment, the first and second end surfaces 420, 422 are generally planar. In one aspect of the present disclosure, the first end surface 420 is adapted for engagement with the base 306 of the enclosure 302.

The mating bearing surface 424 is adapted to engage the bearing surface 418 of the first ring member 406 in sliding contact. The mating bearing surface 424 is disposed at an angle that is about equal to the oblique angle.

In one aspect of the present disclosure, an outer periphery of the puck member 410 is sized slightly smaller than the inner bore 416 of the first ring member 406. This difference in size between the outer periphery of the puck member 410 and the inner bore 416 of the first ring member 406 creates a clearance between the first ring member 406 and the puck member 410. This clearance allows for rotation of the puck member 410 in the first ring member 406 following dimensional expansion of the outer periphery of the puck member 410, which results from heat generated from rotation of the puck member 410 in the first ring member 406. In one aspect of the present disclosure, the clearance is filled with silicon grease or other lubricant to reduce the amount of heat generated.

In one aspect of the present disclosure, the outer circumferential surfaces 411a, 411b of the first and second ring members 406, 408 of the bearing assembly 404 form the drum 342. The fiber optic cable 343 is coiled around the outer circumferential surfaces 411a, 411b of the bearing assembly 404.

While the cable enclosure assembly 300 described above is suitable for use in the fiber optic network 10 depicted in FIG. 1 of the present disclosure, it will be understood that a similar cable enclosure assembly 300 could be used in the fiber optic network assemblies 10, 100, 200 depicted in FIGS. 4, 5 and 6. In the fiber optic network assemblies 10, 100, 200 as depicted in FIGS. 4, 5 and 6, the cable spool 304 can be modified so that the adapter bulkhead portion 360 is removed from the cable spool 304.

Referring now to FIGS. 7-10, the use of the cable enclosure assembly 300 will be described. With the fiber optic cable 343 coiled around the drum 342 of the cable spool 304 and the first end 344 of the fiber optic cable 343 engaged with the first side 390 of the adapters 374 in the adapter bulkhead portion 360, the second end 345 of the fiber optic cable 343 can be paid out through one of the first and second openings 318, 320. As the second end 345 is pulled through one of the first and second openings 318, 320, the cable spool 304 rotates in the enclosure 302 about the rotation axis 346. After the second end 345 of the fiber optic cable 343 has been paid out, the second side 403 of the adapters 374 can be engaged with a connectorized cable (e.g., patch cable, jumper cable, etc.). In one aspect of the present disclosure, the entire length of the fiber optic cable 343 is not completely deployed during pay out. In this scenario, the residual length of fiber optic cable 343 (which is equal to the entire length minus the deployed length) remains coiled around the drum 342 of the cable spool 304.

Figure 7:
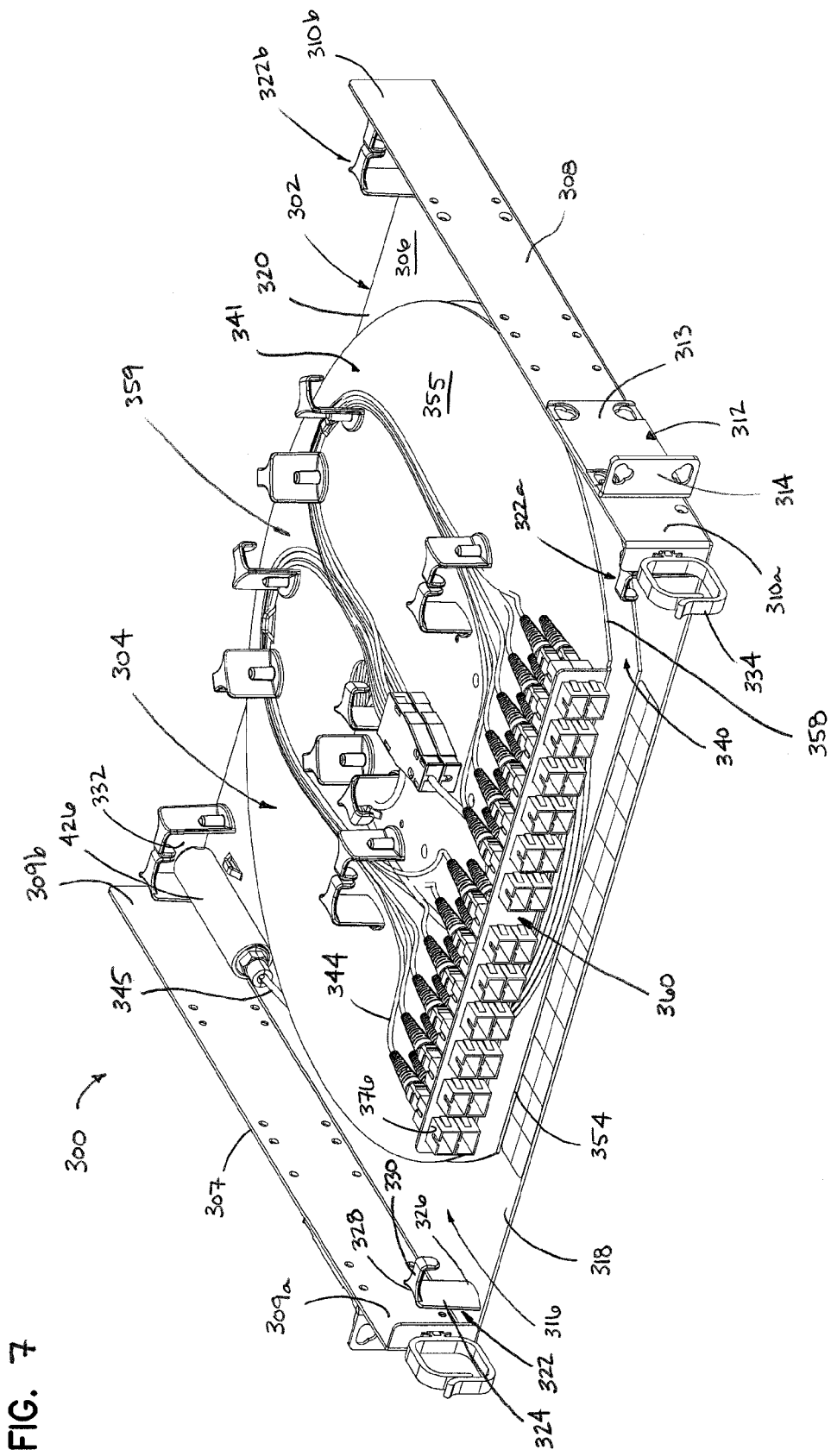
FIG. 7 is a front perspective view of a cable enclosure assembly suitable for use in the fiber optic network assembly of FIG. 1.
Figure 8:
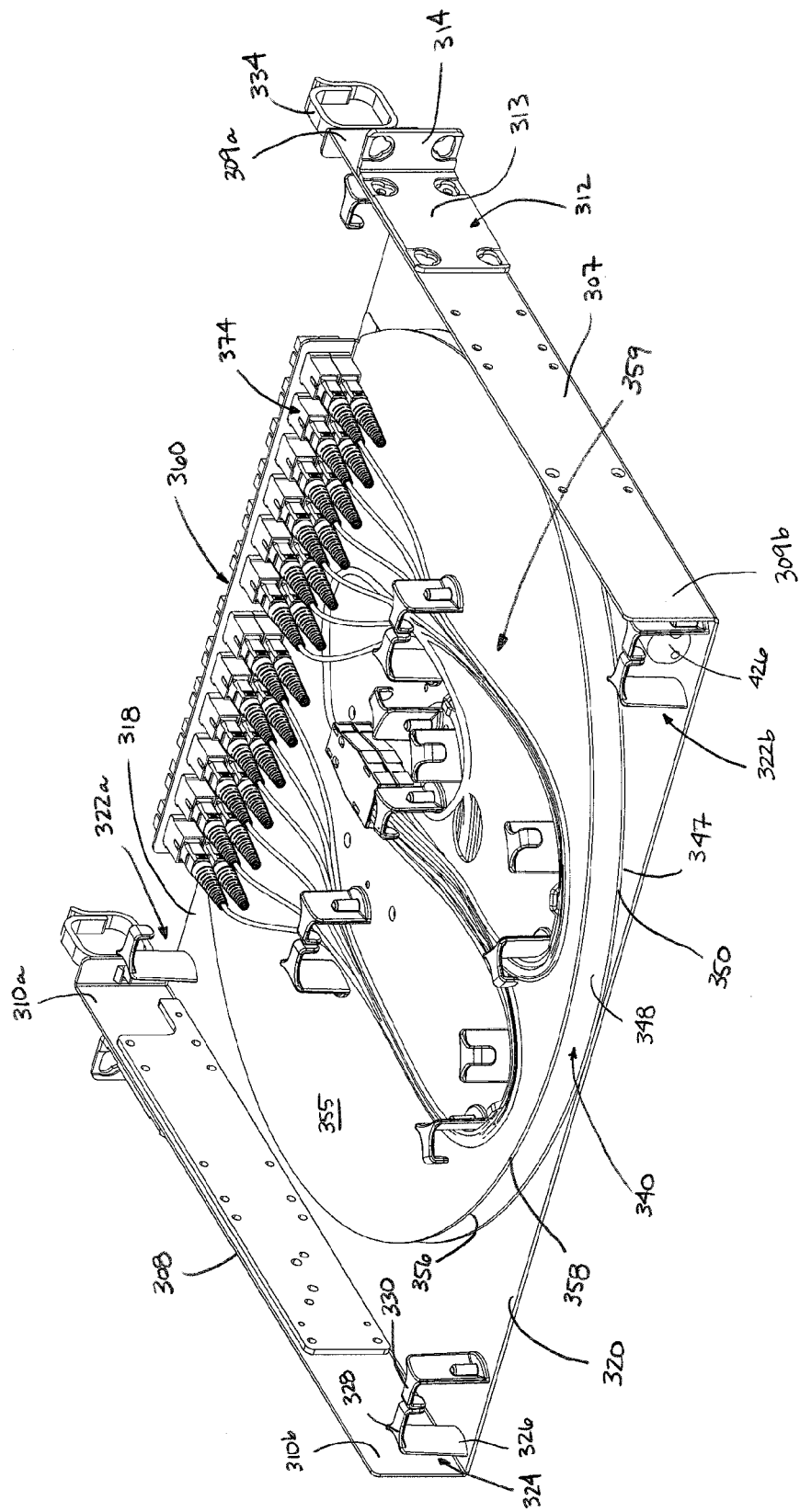
FIG. 8 is a rear perspective view of the cable enclosure assembly of FIG. 7.
Figure 9:
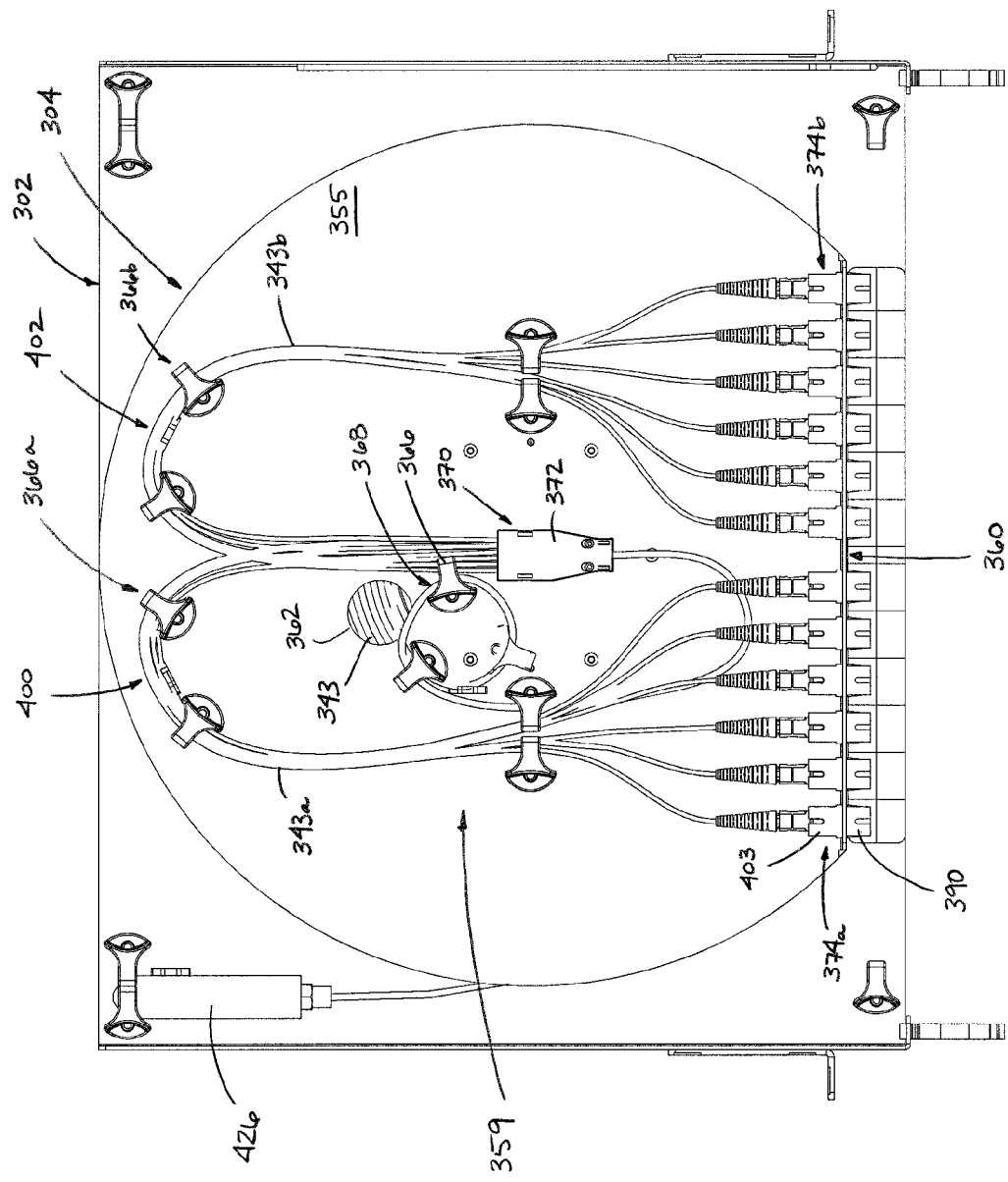
FIG. 9 is a top view of the cable enclosure assembly of FIG. 7.

In the depicted embodiment of FIGS. 7-9, a pulling assembly 426 encloses the second end 345 of the fiber optic cable 343. A pulling assembly suitable for use with the second end 345 of the fiber optic cable 343 has been described in U.S. Patent Application Ser. No. 61/176,721 (now U.S. patent application Ser. No. 12/775,011), entitled "Cable Pulling Assembly" and filed on May 8, 2009, and U.S. Patent Application Ser. No. 61/177,879 (now U.S. patent application Ser. No. 12/779,198), entitled "Cable Pulling Assembly" and filed on May 13, 2009, the disclosures of which are hereby incorporated by reference in their entirety.

Referring now to FIGS. 13-19, an alternate embodiment of the cable enclosure assembly 500 is shown. The cable enclosure assembly 500 includes an enclosure, generally designated 502, and a cable spool, generally designated 504, rotatably disposed in the enclosure 502.

The enclosure 502 includes a base panel 506, a first sidewall 508, an oppositely disposed second sidewall 510, and a third sidewall 512. The first, second and third sidewalls 508, 510, 512 extend outwardly from the base panel 506. In one aspect of the present disclosure, the first, second and third sidewalls 508, 510, 512 extend outwardly in a direction that is generally perpendicular to the base panel 506. In the depicted embodiment of FIGS. 13-15, the first sidewall 508 is generally parallel to the second sidewall 510. The first sidewall 508 includes a first end 514a and an oppositely disposed second end 514b while the second sidewall 510 includes a first end 516a and an oppositely disposed second end 516b. The first ends 514a, 516a of the first and second sidewalls 508, 510 and the base 506 cooperatively define a first opening 517 of the enclosure 502.

The third sidewall 512 is disposed between the second ends 514b, 516b of the first and second sidewalls 508, 510 and oriented so that the third sidewall 512 is generally perpendicular to the first and second sidewalls 508, 510. The third sidewall 512 includes a first end 518a and an oppositely disposed second end 518b.

Figure 13:
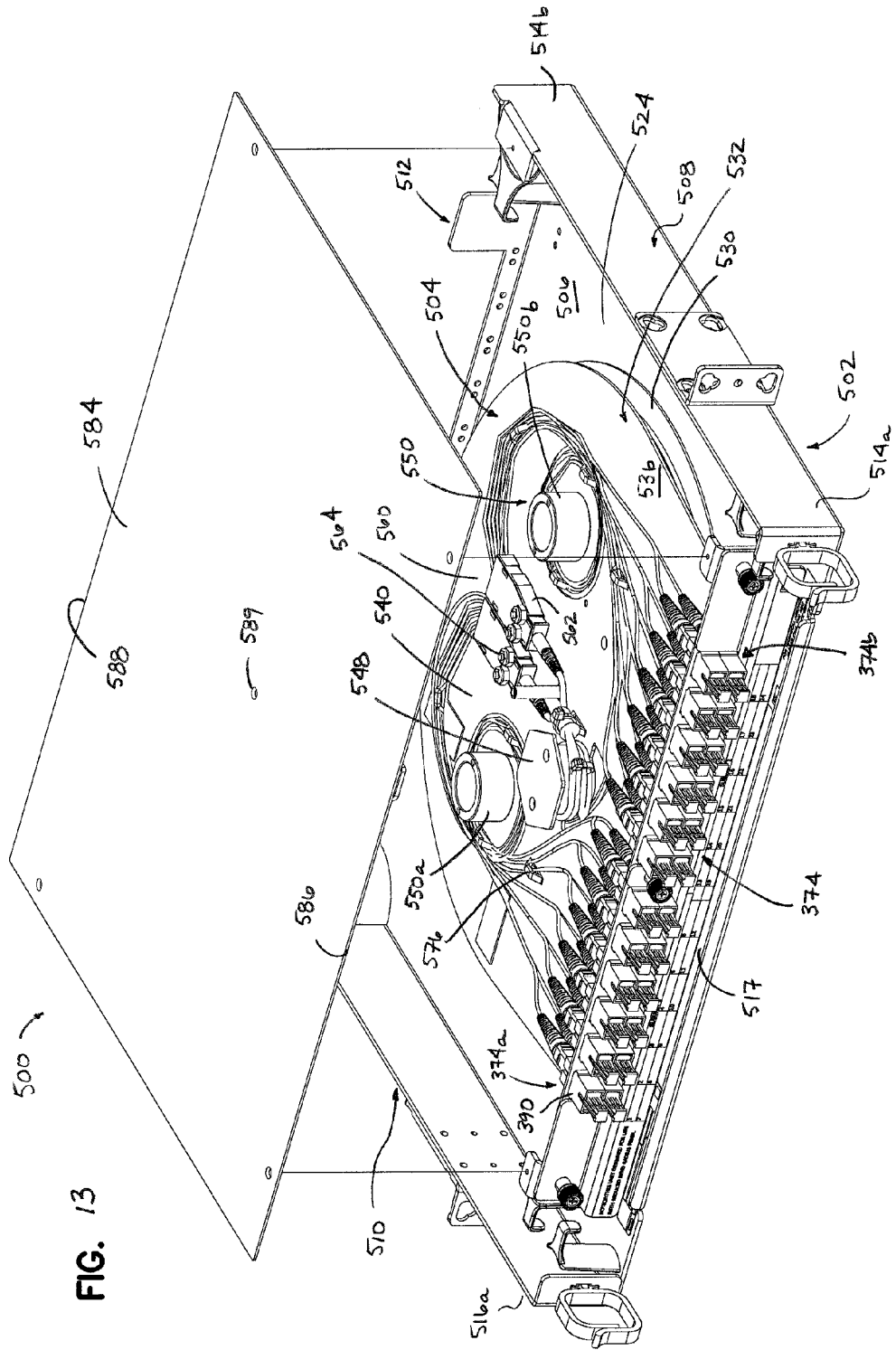
FIG. 13 is a perspective view of an alternate embodiment of a cable enclosure assembly showing a cable spool in a first stored position.
Figure 14:
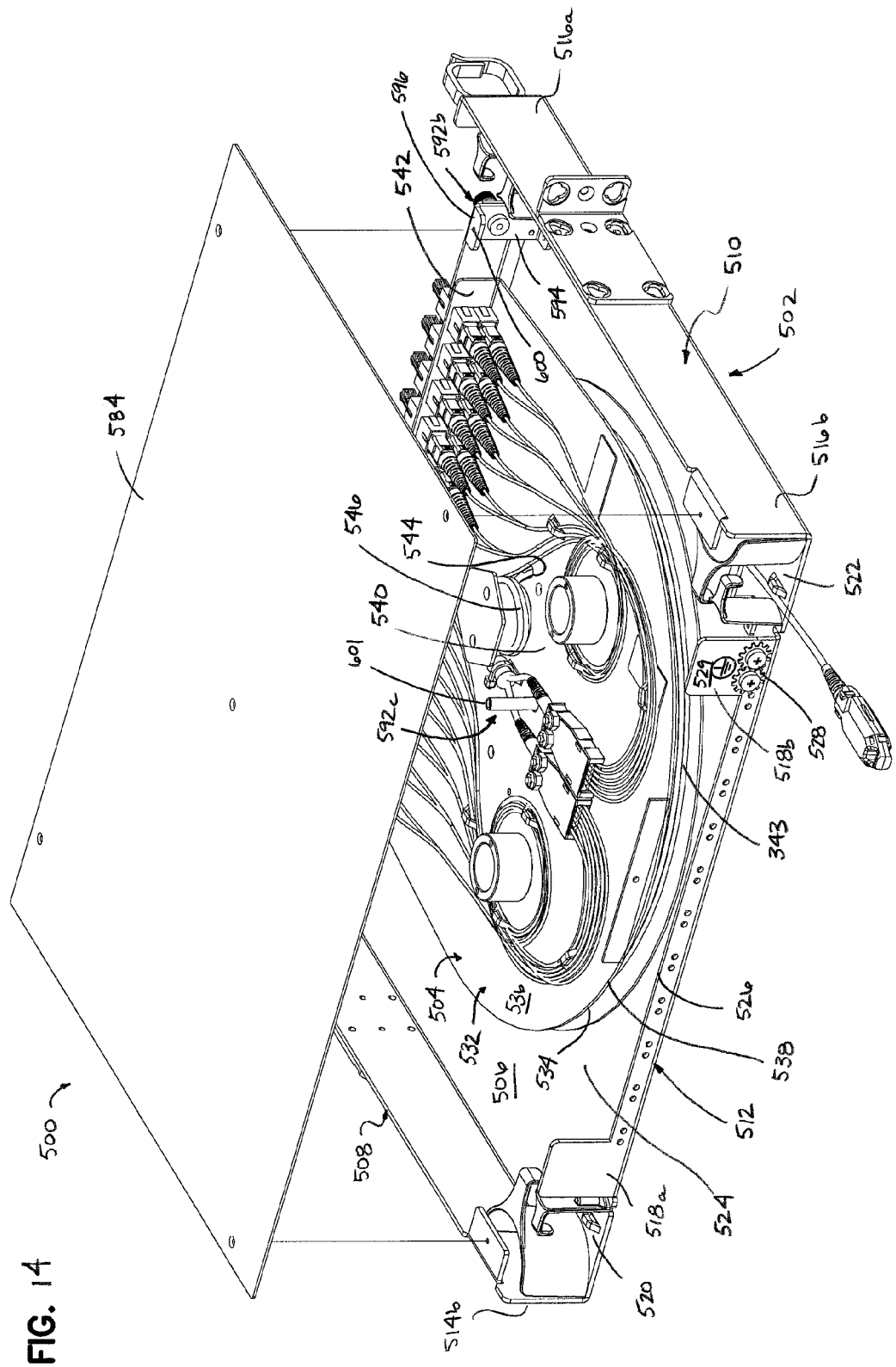
FIG. 14 is a perspective view of the cable enclosure assembly of FIG. 13.
Figure 15:
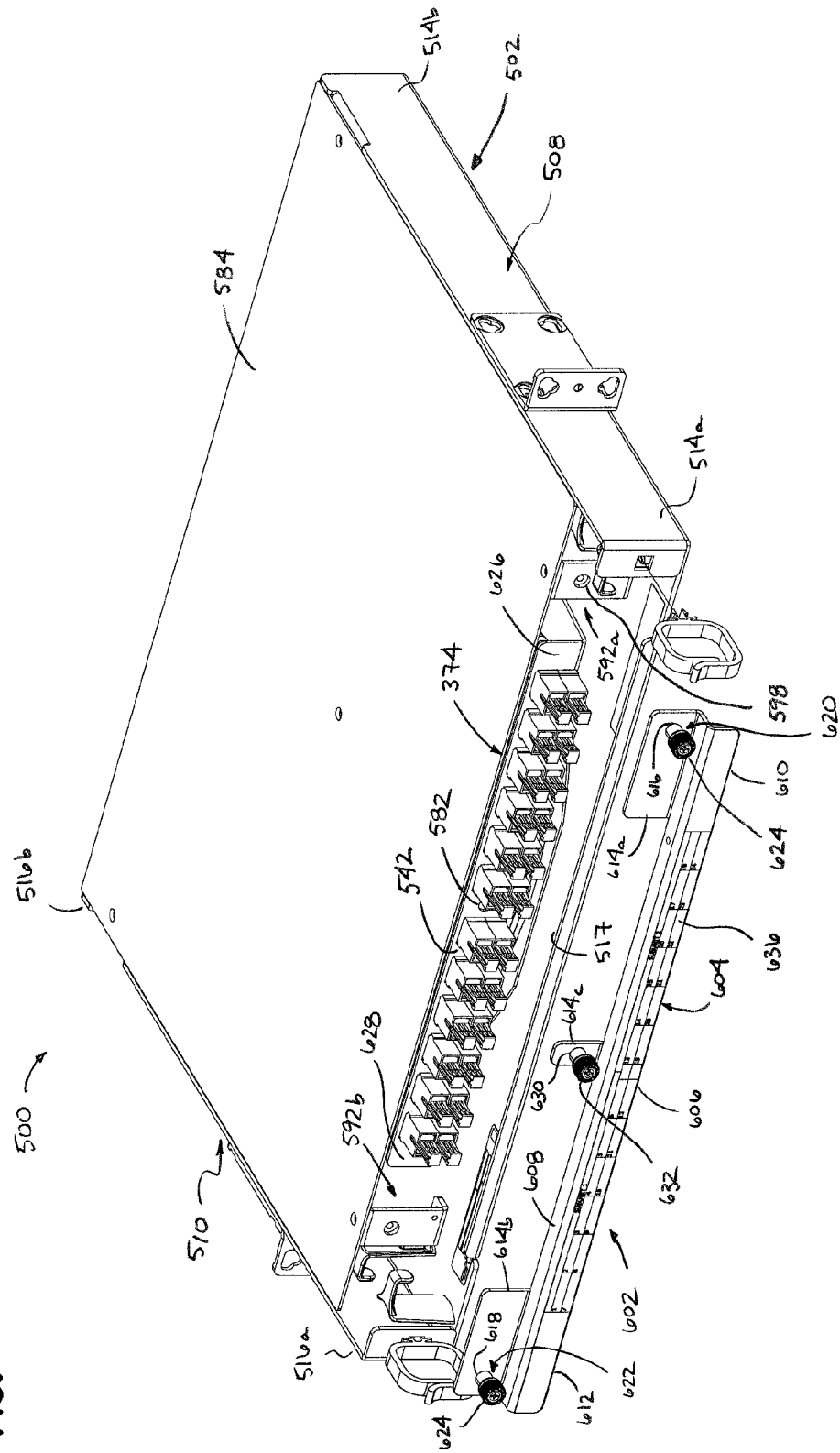
FIG. 15 is an exploded perspective view of the cable enclosure assembly of FIG. 13 showing a spool lock.
Figure 16:
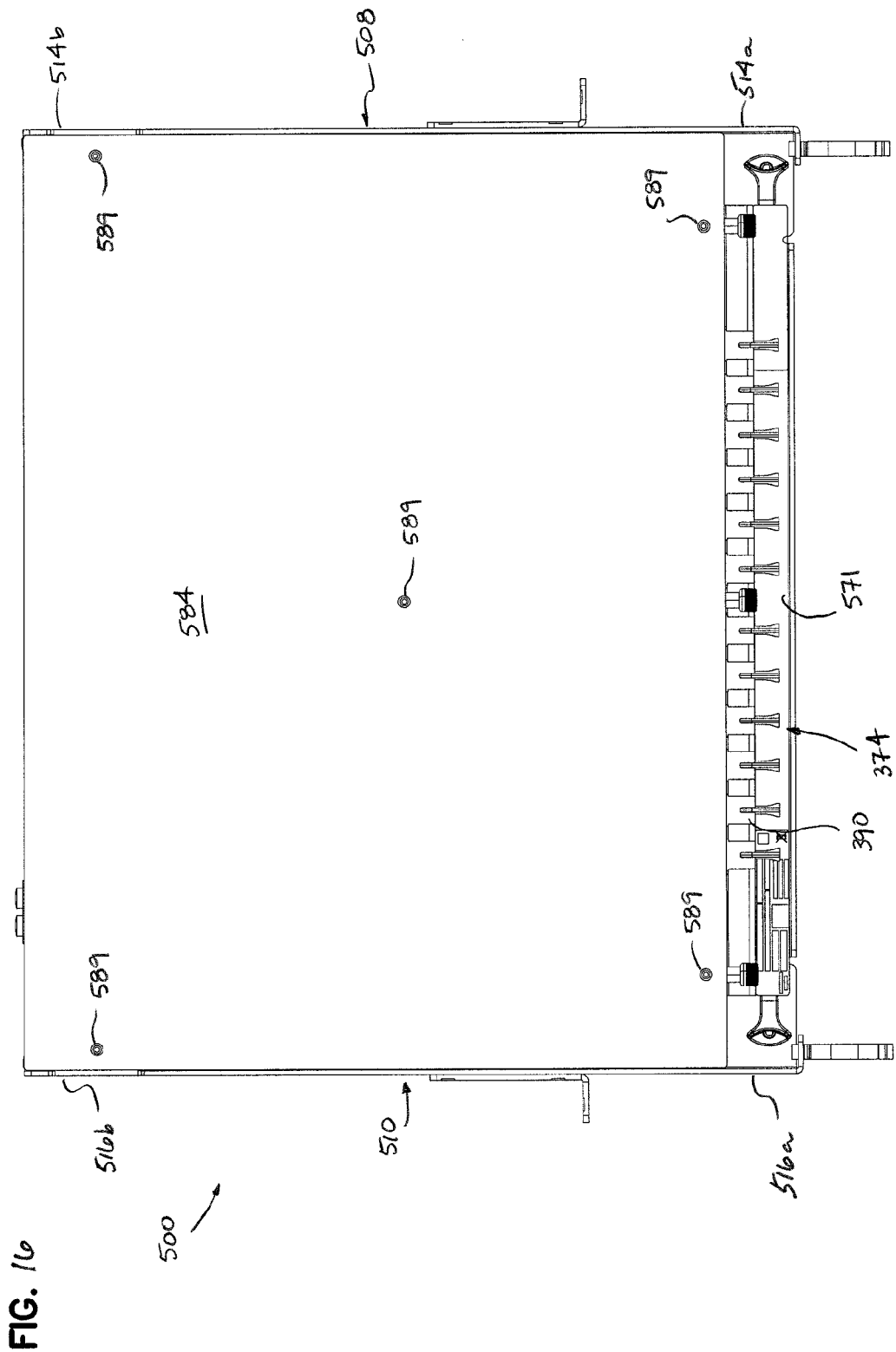
FIG. 16 is a top view of the cable enclosure assembly of FIG. 13.
Figure 17:
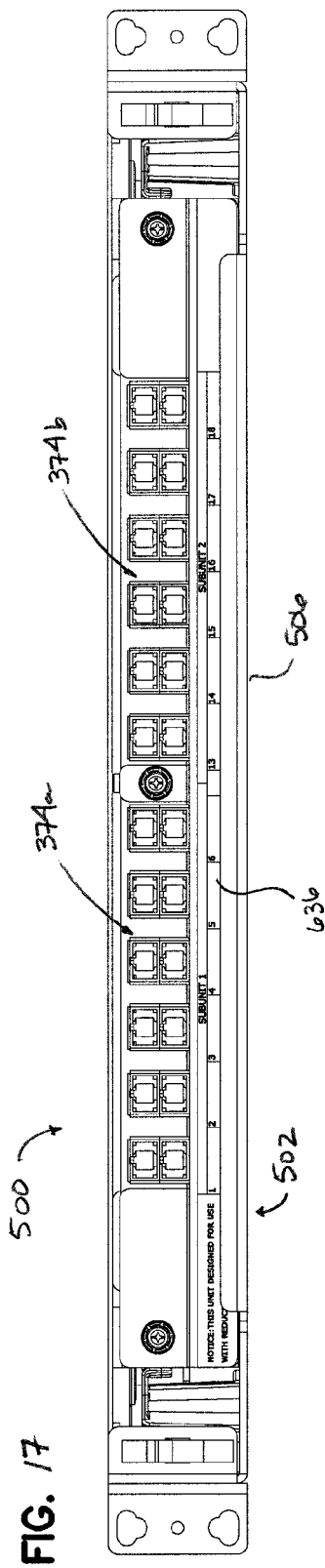
FIG. 17 is a front view of the cable enclosure assembly of FIG. 13.
Figure 18:
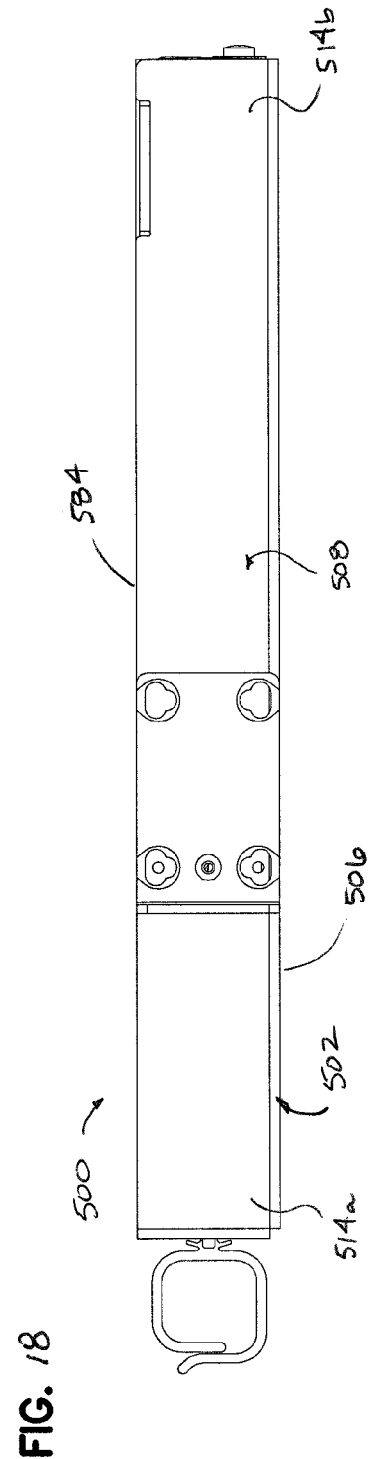
FIG. 18 is a side view of the cable enclosure assembly of FIG. 13.

In the depicted embodiment of FIGS. 13-15, the first and second ends 518a, 518b of the third sidewall 512 do not abut the second ends 514b, 516b of the first and second sidewalls 508, 510, respectively. The second end 514b of the first sidewall, the first end 518a of the third sidewall 512 and the base panel 506 define a first passage 520 while the second end 516b of the second sidewall 510, the second end 518b of the third sidewall 512 and the base panel 506 define a second passage 522. Each of the first and second passages 522 provides access to an interior region 524 of the enclosure 502, which is cooperatively defined by the first, second and third sidewalls 508, 510, 512 and the base panel 506.

The third sidewall 512 defines an access opening 526. The access opening 526 is disposed between the first and second ends 518a, 518b of the third sidewall 512. The access opening 526 extends through the third sidewall 512. In one aspect of the present disclosure, the access opening 526 is a generally U-shaped opening.

In one aspect of the present disclosure, the third sidewall 512 includes a grounding fastener 528. The grounding fastener 528 is disposed on an outer surface 529 of the third sidewall 512.

The cable spool 504 is rotatably disposed in the interior region 524 of the enclosure 502. In one aspect of the present disclosure, the cable spool 504 includes a first flange 530, an oppositely disposed second flange 532 and a drum disposed between the first and second flanges 530, 532. The fiber optic cable 343 is wrapped around the drum of the cable spool 504.

The first flange 530 is structurally similar to the first flange 340 of the cable enclosure assembly 302 previously described. The second flange 532 includes a first surface 534, an oppositely disposed second surface 536 that is disposed adjacent to the drum, and an outer peripheral side 538. The second flange 532 further includes a cable management portion 540 and an adapter bulkhead portion 542.

The cable management portion 540 includes a cable pass-thru 544 that extends through the first and second surfaces 534, 536 of the second flange 532. The cable pass-thru 544 provides a passage through which an end portion 546 of the fiber optic cable 343 can pass from the drum through the second flange 532 so that the portion of the fiber optic cable 343 is disposed in the cable management portion 540.

The cable management portion 540 includes a strain relief spool 548. The strain relief spool 548 is disposed on the second surface 536 of the second flange 532 adjacent to the cable pass-thru 544. The strain relief spool 548 is adapted to receive a portion of the end portion 546 of the fiber optic cable 343. The portion of the fiber optic cable 343 is wrapped around the strain relief spool 548. The strain relief spool 548 protects the end portion 546 of the fiber optic cable 343 disposed in the cable management portion 540 from being disrupted in the event that the fiber optic cable 343 is pulled after all of the fiber optic cable 343 disposed around the drum of the cable spool 504 has been paid out.

The cable management portion 540 further includes a plurality of cable management spools 550 around which the end portions 546 of the fiber optic cable 343 are coiled. In the depicted embodiment of FIG. 13, the end portions 546 of the fiber optic cable 343 are loosely coiled around the cable management spools 550. This loose coiling provides excess lengths of individual fibers of the end portions 546 of the fiber optic cable 343. In one aspect of the present disclosure, the cable management portion 540 includes a first cable management spool 550a and a second cable management spool 550b.

The cable management portion 540 further includes a fan-out mounting area 560 that is adapted to receive a fan-out 562. In one aspect of the present disclosure, the fan-out mounting area 560 includes a plurality of fan-outs 562. The fan-outs 562 serve as a transition location between the fiber optic cable 343 and the individual upjacketed fibers of the fiber optic cable 343. In one aspect of the present disclosure, the fan-out mounting area 560 includes a plurality of fasteners 564 (e.g., screws, nuts, etc.) that retains the fan-out 562 in the fan-out mounting area 560.

The cable management portion 540 further includes a plurality of cable anchors 576. The cable anchors 576 extend outwardly from the second surface 536 of the second flange 532 and define an opening through which a cable tie can pass. The cable tie is adapted for retaining the fiber optic cable 343 in the cable management portion 540.

The adapter bulkhead portion 542 extends outwardly from the cable management portion 540 of the second flange 532. In one aspect of the present disclosure, the adapter bulkhead portion 542 is about perpendicular to the cable management portion 540. The adapter bulkhead portion 542 is generally planar in shape and forms a chordal side surface of the second flange 532 of the cable spool 504. In one aspect of the present disclosure, the adapter bulkhead portion 542 is generally parallel to the first opening 517 of the enclosure 502 when the cable spool 304 is in a first stored position (best shown in FIG. 13).

The adapter bulkhead portion 542 is adapted to receive the plurality of adapters 374. The adapter bulkhead portion 542 defines a plurality of adapter openings in which the plurality of adapters 374 is mounted.

The adapter bulkhead portion 542 defines a bracket mount 582. In the depicted embodiment of FIGS. 13-15, the bracket mount 582 is a threaded hole that is centrally located on the adapter bulkhead portion 542. In one aspect of the present disclosure, the bracket mount 582 is disposed between a first plurality of adapters 374a and a second plurality of adapters 374b.

The cable enclosure assembly 500 further includes a cover 584. The cover 584 is adapted for engagement with the enclosure 502. When the cover 584 is engaged to the enclosure 502, the cover 584 is generally parallel to the base panel 506 and extends between the first and second sidewalls 508, 510. The cover 584 includes a first edge 586 and an oppositely disposed second edge 588. The first edge 586 is offset from the first opening 517 of the enclosure 502. In one aspect of the present disclosure, the first edge 586 is generally aligned with the adapter bulkhead portion 542 of the cable spool 504 when the cable spool is in the first stored position. The second edge 588 is generally aligned with the third sidewall 512 of the enclosure 502.

In the depicted embodiment of FIGS. 13-16, the cover 584 includes a plurality of mounting holes 589. The mounting holes 589 are adapted to receive fasteners for mounting the cover 584 to the enclosure 502. In the depicted embodiment of FIGS. 13-16, the cover 584 includes five mounting holes 589.

Referring now to FIGS. 13-15, the enclosure 502 includes a plurality of mounting posts 592. In the depicted embodiment, the enclosure 502 includes a first mounting post 592a disposed adjacent to the first end 514a of the first sidewall 508, a second mounting post 592b disposed adjacent to the first end 516a of the second sidewall 510 and a third mounting post 592c that extends through a rotating axis of the cable spool 504.

The first and second mounting posts 592b, 592c extend outwardly from the base panel 506 at a location adjacent to the first opening 517. Each of the first and second mounting posts 592a, 592b includes a body 594 having an end 596. The end 596 is oriented so that the end 596 extends outwardly from the body 594 in a generally perpendicular direction. The body 594 defines a first mounting hole 598 while the end 596 defines a second mounting hole 600. The first and second mounting holes are oriented so that a longitudinal axis through the first mounting hole 598 is generally perpendicular to a longitudinal axis through the second mounting hole 600. The second mounting hole 600 is adapted for alignment with one of the mounting holes 589 of the cover 584.

The body 594 of each of the first and second mounting posts 592 is disposed near the first opening 517 of the enclosure 502 so that the body 594 is generally aligned with the adapter bulkhead portion 542 when the cable spool 504 is in the first stored position. Each of the first and second mounting posts 592 is disposed at a radial distance from a center of the cable spool 504 that is greater than the radius of the second flange 532.

The third mounting post 592c includes a hole 601 having a longitudinal axis that is coaxial with the rotating axis of the cable spool 504. The hole 601 of the third mounting post 592c is adapted for alignment with one of the mounting holes 589 of the cover 584. The hole 601 is further adapted to receive a fastener that extends through the cover 584.

The cable enclosure assembly 500 further includes a spool lock 602. The spool lock 602 is adapted for engagement with the cable spool 504 to prevent rotation of the cable spool 504 relative to the enclosure 502. The spool lock 602 includes a body 604. The body 604 is generally L-shaped and includes a first portion 606 and a second portion 608. The first and second portions 606, 608 are generally perpendicular. The body 604 further includes a first axial end 610 and an oppositely disposed second axial end 612.

The spool lock 602 further includes a plurality of tabs 614. Each of the tabs 614 extends outwardly from the second portion 608 of the body 604 so that each of the tabs 614 is generally perpendicular to the second portion 608 and generally parallel to the first portion 606 so that each of the tabs 614 is generally offset from the first portion 606.

In one aspect of the present disclosure, the plurality of tabs 614 includes a first tab 614a disposed at the first axial end 610 of the body 604 of the spool lock 602 and a second tab 614b disposed at the second axial end 612 of the body 604. The first tab 614a is adapted for engagement with the first mounting post 592a while the second tab 614b is adapted for engagement with the second mounting post 592b.

The first tab 614a defines a first hole 616 that is adapted for alignment with the first mounting hole 598 of the first mounting post 592a. The second tab 614b defines a second hole 618 that is adapted for alignment with the second mounting hole 600 of the second mounting post 592b. First and second fastener 620, 622 extend through the first and second holes 616, 618, respectively. The first and second fasteners 620, 622 are adapted for engagement with the first and second mounting holes 598, 600 of the first and second mounting posts 592a, 592b. In one aspect of the present disclosure, each of the first and second fasteners 620, 622 includes a gripping portion 624 that is used to rotate the fastener for engagement with the mounting posts 592.

With the first tab 614a engaged to the first mounting post 592a, the second tab 614b engaged to the second mounting post 592b and the cable spool 504 disposed in the first stored position, a portion of the first tab 614a overlaps a first end portion 626 of the adapter bulkhead portion 542 of the cable spool 504 while a portion of the second tab 614b overlaps a second end portion 628 of the adapter bulkhead portion 542. This overlap prevents rotation of the cable spool 504 relative to the enclosure 502 in either direction of rotation (i.e., clockwise or counterclockwise). If the cable spool 504 is rotated in the clockwise direction, the first end portion 626 of the adapter bulkhead portion 542 abuts the overlapping portion of the first tab 614a. This abutment between the first end portion 626 of the adapter bulkhead portion 542 and the overlapping portion of the first tab 614a prevents rotation in the clockwise direction. If the cable spool 504 is rotated in the counterclockwise direction, the second end portion 628 of the adapter bulkhead portion 542 abuts the overlapping portion of the second tab 614b. This abutment between the second end portion 628 of the adapter bulkhead portion 542 and the overlapping portion of the second tab 614b prevents rotation in the counterclockwise direction.

In the depicted embodiment of FIGS. 13-15, the spool lock 602 further includes a third tab 614c. The third tab 614c is centrally disposed between the first and second tabs 614a, 614b. The third tab 614c extends outwardly from the second portion 608 of the body 604 so that the third tab 614c is generally perpendicular to the second portion 608, generally parallel to the first portion 606, and generally aligned with the first and second tabs 614a, 614b. The third tab 614c defines a third hole 630. The third hole 630 is adapted for alignment with the bracket mount 582 of the adapter bulkhead portion 542 of the cable spool 504 when the first and second tabs 614a, 614c are engaged with the first and second mounting posts 592a, 592b. A third fastener 632 extends through the third hole 630 of the third tab 614c. The third fastener 632 is adapted for engagement with the bracket mount 582 of the adapter bulkhead portion 542.

The first portion 606 of the spool lock 602 includes an identification area 636. In one aspect of the present disclosure, the identification area 636 of the spool lock 602 includes indicium (e.g., numbers, letters, symbols, colors, etc.) that identifies each of the plurality of adapters 374 mounted to the adapter bulkhead portion 542 of the cable spool 504.

Figure 19:
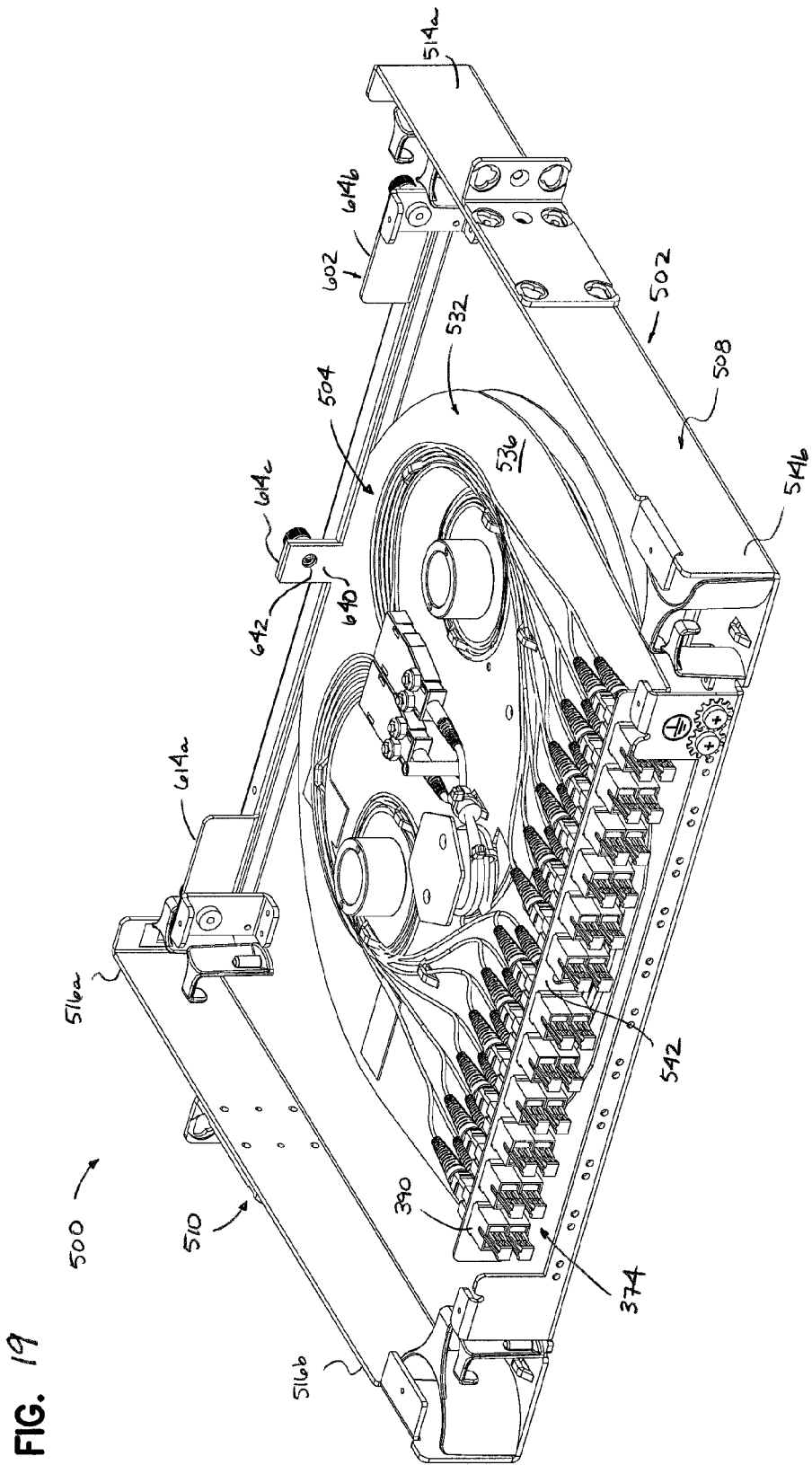
FIG. 19 is perspective view of the cable enclosure assembly with a cover removed showing the cable spool in a second stored position.

Referring now to FIGS. 13 and 19, the cable spool 504 can be held in position by the spool lock 602 in the first stored position (shown in FIG. 13) and a second stored position (shown in FIG. 19). In the first stored position, the first sides 390 of the adapters 374, which are mounted on the adapter bulkhead portion 542 of the cable spool 504, are accessible through the first opening 517 of the cable enclosure assembly 500. In the second stored position, the cable spool 504 is oriented in a position that is about 180 degrees from the first stored position so that the first sides 390 of the adapters 374, which are mounted on the adapter bulkhead portion 542 of the cable spool 504, are accessible through the access opening 526 of the third sidewall 512.

When the cable spool 504 is disposed in the first stored position, the first and second tabs 614a, 614b of the spool lock 602 are engaged with the mounting posts 592a, 592b while the third tab 614c is engaged with the adapter bulkhead portion 542 of the cable spool 504. When the cable spool 504 is disposed in the second stored position, the first and second tabs 614a, 614b of the spool lock 602 are engaged with the mounting posts 592a, 592b while the third tab 614c of the spool lock 602 is engaged with a lock tab 640 disposed on the second flange 532 of the cable spool 504. The lock tab 640 extends outwardly from the second flange 532 and is generally parallel to the adapter bulkhead portion 542 of the cable spool 504. The lock tab 640 includes a mount 642 that is adapted to receive the third fastener 632 of the spool lock 602.

The cable enclosure assembly 500 is adapted for mounting in various positions. For example, the cable enclosure assembly 500 can be mounted in the first optical distribution frame 12 so that the base panel 506 is the bottom panel of the cable enclosure assembly 500. Alternatively, the cable enclosure assembly 500 can be mounted in the first optical distribution frame 12 so that the base panel 506 is the left-most, right-most, front-most, rear most or upper-most panel of the cable enclosure assembly 500.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cable enclosure assembly comprising:
    an enclosure, the enclosure comprising:
        a first major surface;
        a second major surface generally parallel to the first major surface;
        a first sidewall; and
        a second sidewall oppositely disposed to the first sidewall;
    wherein the first sidewall and the second sidewall extending generally perpendicularly between the first major surface and the second major surface, the enclosure defining an interior region and a first opening that provides access to the interior region;
    mounting brackets attached to the first sidewall and the second sidewall for mounting the enclosure to a distribution frame, the brackets being configured such that when the enclosure is mounted to the distribution frame the first major surface is a top surface and the second major surface is a bottom surface;
    a cable spool disposed in the interior region of the enclosure and rotatably engaged with the enclosure, the cable spool being rotatable about an axis that intersects the first and second major surfaces the cable spool including:
        a drum;
        a flange engaged to the drum, the flange having an adapter bulkhead portion;
    a plurality of adapters disposed in the adapter bulkhead portion, each of the adapters including a first side and a second side;
    a length of fiber optic cable disposed about the drum of the cable spool, the fiber optic cable including a first end and an oppositely disposed second end, the first end having connectors engaged to the second sides of the adapters; and
    wherein the cable spool is rotatable in the enclosure to a first stored position in which the first sides of the adapters are aligned with the first opening and accessible through the first opening.

2. The cable enclosure assembly of claim 1, wherein the second end of the fiber optic cable is deployed through the first opening in the first stored position.

3. The cable enclosure assembly of claim 1, wherein the cable spool is rotatable to a second stored position in which the first sides of the adapters are accessible through a second opening that is defined by the enclosure and aligned with the first opening of the enclosure.

4. The cable enclosure assembly of claim 1, wherein the flange includes an outer peripheral side, the adapter bulkhead portion forming a portion of the outer peripheral side.

5. The cable enclosure assembly of claim 4, wherein the adapter bulkhead portion forms a chordal side surface of the flange.

6. The cable enclosure assembly of claim 1, wherein the enclosure includes a base panel, a first sidewall that extends outwardly from the base panel, an oppositely disposed second sidewall that extends outwardly from the base panel, and a cover engaged to the first and second sidewalls.

7. The cable enclosure assembly of claim 6, further comprising a first plurality of bend radius protectors disposed adjacent to the first opening.

8. The cable enclosure assembly of claim 1, further comprising a spool lock that is adapted for engagement with the cable spool to prevent rotation of the cable spool relative to the enclosure.

9. The cable enclosure assembly of claim 1, wherein the flange and the adapter bulkhead portion are integral.

10. A cable enclosure assembly comprising:
    an enclosure defining an interior region, a first opening that provides access to the interior region;
    a cable spool disposed in the interior region of the enclosure and rotatably engaged with the enclosure, the cable spool including:
        a drum;
        a flange engaged to the drum, the flange having an adapter bulkhead portion;
    a plurality of adapters disposed in the adapter bulkhead portion, each of the adapters including a first side and a second side;
    a length of fiber optic cable disposed about the drum of the cable spool, the fiber optic cable including a first end and an oppositely disposed second end, the first end having connectors engaged to the second sides of the adapters;
    a first plurality of bend radius protectors disposed adjacent to the first opening;
    a spool lock adapted for engagement with the cable spool to prevent rotation of the cable spool relative to the enclosure, wherein the spool lock is threadedly engaged with the adapter bulkhead portion of the flange of the cable spool, and wherein the spool lock is adapted to engage the cable spool when the cable spool is in a first stored position in which the first sides of the adapters are aligned with the first opening and accessible through the first opening.

11. The cable enclosure assembly of claim 10, wherein the enclosure includes a base panel, a first sidewall that extends outwardly from the base panel, an oppositely disposed second sidewall that extends outwardly from the base panel, and a cover engaged to the first and second sidewalls.

12. The cable enclosure assembly of claim 10, wherein the adapter bulkhead portion is generally parallel to the first opening in the first stored position.

13. The cable enclosure assembly of claim 10, wherein the flange and the adapter bulkhead portion are integral.

14. A fiber optic network assembly comprising:
    a first optical distribution frame having a cable enclosure assembly, the cable enclosure assembly including:
        an enclosure mounted to the first optical distribution frame; the enclosure comprising:
            a first major surface;
            a second major surface generally parallel to the first major surface;
            a first sidewall; and a second sidewall oppositely disposed to the first sidewall;

wherein the first sidewall and the second sidewall extending generally perpendicularly between the first major surface and the second major surface;

mounting brackets attached to the first sidewall and the second sidewall for mounting the enclosure to a distribution frame, the brackets being configured such that when the enclosure is mounted to the distribution frame the first major surface is a top surface and the second major surface is a bottom surface;

a cable spool rotatably disposed in the enclosure, the cable spool being rotatable about an axis that intersects the first and second major surfaces;

a length of fiber optic cable wrapped around the cable spool, the fiber optic cable having a first end and an oppositely disposed second end, the second end having a multi-fiber connector;

a second optical distribution frame having an adapter that is remotely disposed from the first optical distribution frame, wherein the second end of the fiber optic cable of the cable enclosure assembly of the first optical distribution frame is engaged to the adapter of the second optical distribution frame.

15. The fiber optic network assembly of claim 14, wherein the cable enclosure assembly includes a plurality of adapters disposed on the cable spool so that the plurality of adapters rotate in unison with the cable spool.

16. The fiber optic network assembly of claim 15, wherein the first end of the fiber optic cable includes a plurality of single-fiber connectors engaged with the plurality of adapters.

17. The fiber optic network assembly of claim 14, wherein the first optical distribution frame includes active component, the active component being connected to the cable enclosure assembly by a jumper cable.

18. A cable enclosure assembly comprising:

an enclosure configured to be mounted to a rack, the enclosure defining an interior region, the enclosure including a front right corner, a front left corner, a rear right corner and a rear left corner, the enclosure including a first cable pay-out guide at the front right corner, a second cable pay-out guide at the front left corner, a third cable pay-out guide at the rear right corner and a fourth cable pay-out guide at the rear left corner;

a cable spool disposed in the interior region of the enclosure and rotatably engaged with the enclosure, the cable spool including:

a drum;

a plurality of fiber optic adapters carried with the drum as the drum is rotated, each of the adapters including a first port and a second port;

a length of fiber optic cable disposed about the drum of the cable spool, the fiber optic cable including a first end and an oppositely disposed second end, the first end having connectors inserted within the second ports of the fiber optic adapters; and wherein the cable spool is rotatable in the enclosure to allow the fiber optic cable to be paid out from the cable spool, and wherein when the fiber optic cable is paid out from the cable spool the cable can be routed outwardly from the enclosure through any selected one of the first, second, third and fourth cable pay-out guides.

19. The cable enclosure assembly of claim 18, wherein each of the first, second, third and fourth cable pay-out guides includes at least one bend radius protector.

20. The cable enclosure assembly of claim 18, wherein at least one of the first, second, third and fourth cable pay-out guides includes first and second bend radius protectors between which the fiber optic cable can be routed.

21. A cable enclosure assembly comprising:

an enclosure, the enclosure comprising:

a first major surface;

a second major surface generally parallel to the first major surface;

a first sidewall; and a second sidewall oppositely disposed to the first sidewall;

wherein the first sidewall and the second sidewall extending generally perpendicularly between the first major surface and the second major surface, the enclosure defining an interior region and a first opening that provides access to the interior region;

mounting brackets attached to the first sidewall and the second sidewall for mounting the enclosure to a distribution frame, the brackets being configured such that when the enclosure is mounted to the distribution frame the first major surface is a top surface and the second major surface is a bottom surface;

a cable spool disposed in the interior region of the enclosure and rotatably engaged with the enclosure, the cable spool including:

a drum;

a plurality of adapters carried with the drum as the drum is rotated, each of the adapters including a first side and a second side;

a length of fiber optic cable disposed about the drum of the cable spool, the fiber optic cable including a first end and an oppositely disposed second end, the first end having connectors engaged to the second sides of the adapters; and wherein the cable spool is rotatable in the enclosure to a first stored position in which the first sides of the adapters are aligned with the first opening and accessible through the first opening.

22. A cable enclosure assembly comprising:

an enclosure, the enclosure comprising:

a first major surface;

a second major surface generally parallel to the first major surface;

a first sidewall; and a second sidewall oppositely disposed to the first sidewall;

wherein the first sidewall and the second sidewall extending generally perpendicularly between the first major surface and the second major surface, the enclosure defining an interior region and a first opening that provides access to the interior region;

mounting brackets attached to the first sidewall and the second sidewall for mounting the enclosure to a distribution frame, the brackets being configured such that when the enclosure is mounted to the distribution frame the first major surface is a top surface and the second major surface is a bottom surface;

a cable spool disposed in the interior region of the enclosure and rotatably engaged with the enclosure, the cable spool including:

a drum;

a plurality of adapters carried with the drum as the drum is rotated, each of the adapters including a first side and a second side;

a straight edge adapter plate attached on the cable spool being having an opening in front of the enclosure, and the adapter plate being configured to receive at least one of the plurality of adapters;

a length of fiber optic cable disposed about the drum of the cable spool, the fiber optic cable including a first end and an oppositely disposed second end, the first end having connectors engaged to the second sides of the adapters; and wherein the cable spool is rotatable in the enclosure to a first stored position in which the first sides of the adapters are aligned with the first opening and accessible through the first opening.

23. A cable enclosure assembly comprising:

an enclosure defining an interior region and a first opening that provides access to the interior region;

a cable spool disposed in the interior region of the enclosure and rotatably engaged with the enclosure, the cable spool including:
   a drum;
   a flange engaged to the drum, the flange having an adapter bulkhead portion;

a plurality of adapters disposed in the adapter bulkhead portion, each of the adapters including a first side and a second side;

a length of fiber optic cable disposed about the drum of the cable spool, the fiber optic cable including a first end and an oppositely disposed second end, the first end having connectors engaged to the second sides of the adapters;

a spool lock that is adapted for engagement with the cable spool to prevent rotation of the cable spool relative to the enclosure, wherein the spool lock is threadedly engaged with the adapter bulkhead portion of the flange of the cable spool; and wherein the cable spool is rotatable in the enclosure to a first stored position in which the first sides of the adapters are aligned with the first opening and accessible through the first opening.

24. A cable enclosure assembly comprising:

an enclosure defining an interior region, a first opening that provides access to the interior region;

a cable spool disposed in the interior region of the enclosure and rotatably engaged with the enclosure, the cable spool including:
   a drum;
   a flange engaged to the drum, the flange having an adapter bulkhead portion;

a plurality of adapters disposed in the adapter bulkhead portion, each of the adapters including a first side and a second side;

a length of fiber optic cable disposed about the drum of the cable spool, the fiber optic cable including a first end and an oppositely disposed second end, the first end having connectors engaged to the second sides of the adapters, wherein the cable spool is rotatable to a second stored position in which the first sides of the adapters are accessible through a second opening that is defined by the enclosure and aligned with the first opening of the enclosure;

a first plurality of bend radius protectors disposed adjacent to the first opening; and a spool lock adapted for engagement with the cable spool to prevent rotation of the cable spool relative to the enclosure, wherein the spool lock is adapted to engage the cable spool when the cable spool is in a first stored position in which the first sides of the adapters are aligned with the first opening and accessible through the first opening.

* * * * *